May 19, 1959 J. VAN HORN WHIPPLE ET AL 2,887,318
BOWLING PIN HANDLING APPARATUS
Original Filed March 24, 1947 26 Sheets-Sheet 1

INVENTORS.
Jack Van Horn Whipple,
BY Albert L. Odmark.

May 19, 1959   J. VAN HORN WHIPPLE ET AL   2,887,318
BOWLING PIN HANDLING APPARATUS
Original Filed March 24, 1947   26 Sheets-Sheet 5

INVENTORS.
Jack Van Horn Whipple,
BY Albert L. Odmark,

May 19, 1959     J. VAN HORN WHIPPLE ET AL     2,887,318
BOWLING PIN HANDLING APPARATUS
Original Filed March 24, 1947                26 Sheets-Sheet 6
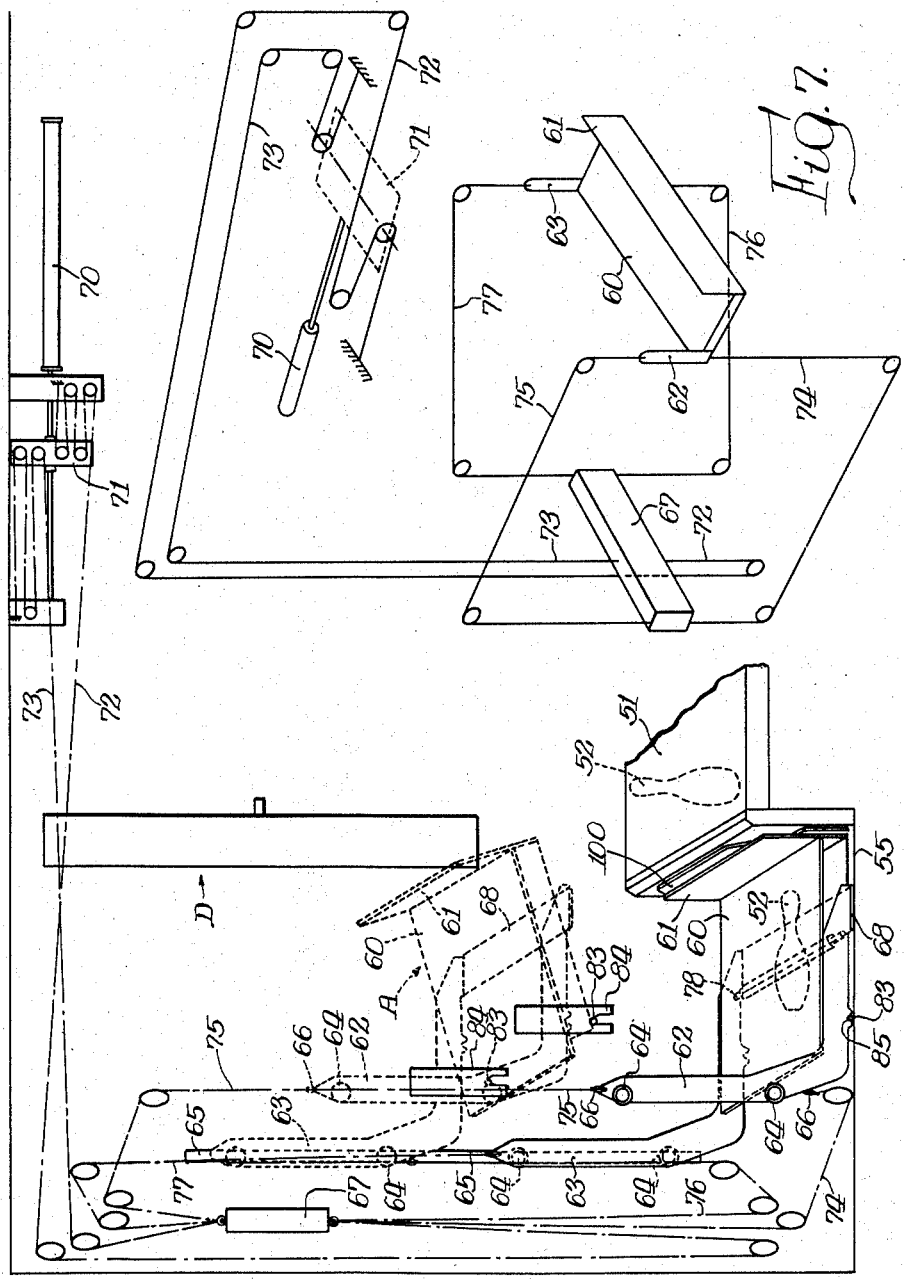
INVENTORS.
Jack Van Horn Whipple,
BY Albert L. Odmark,

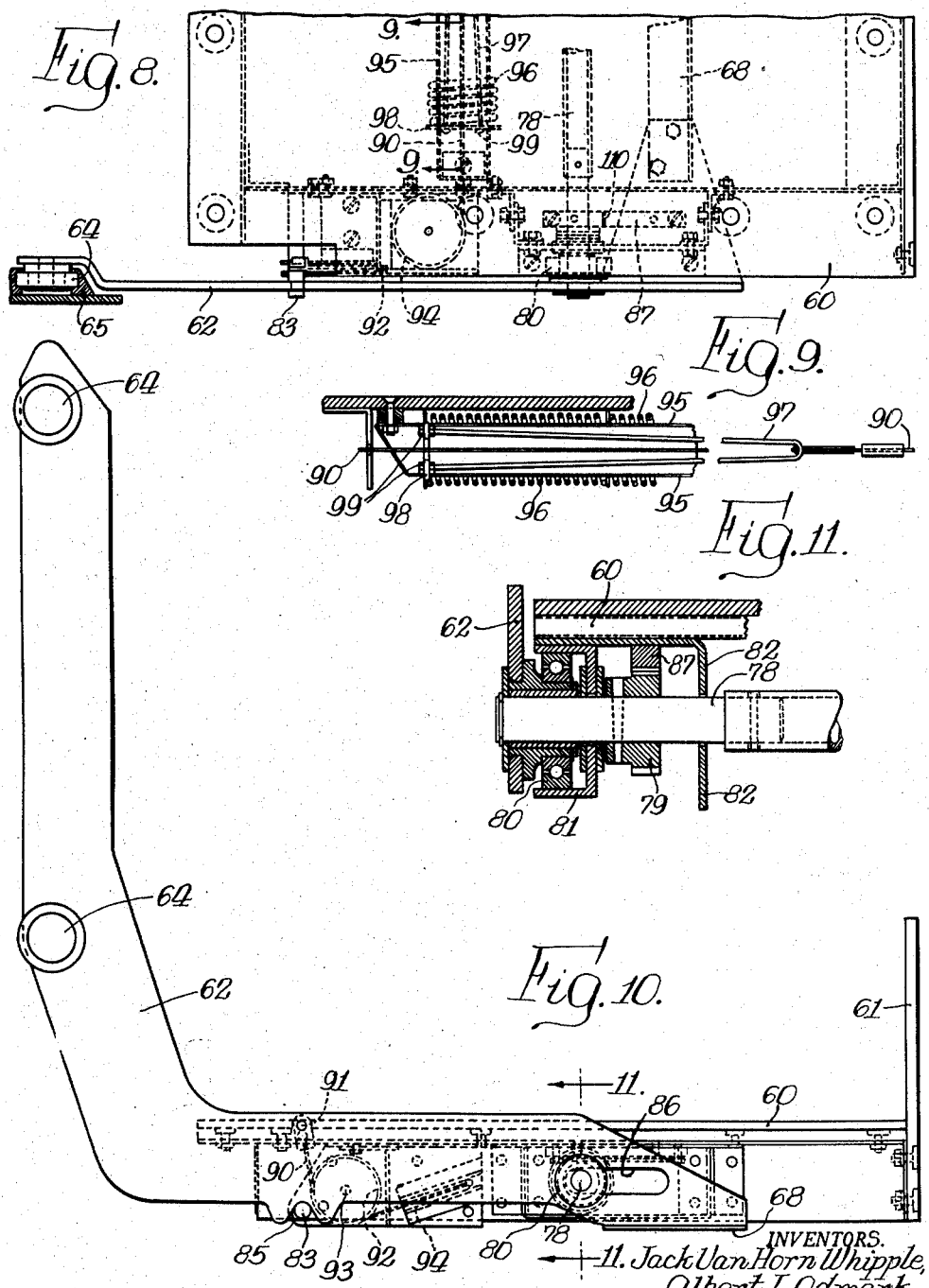

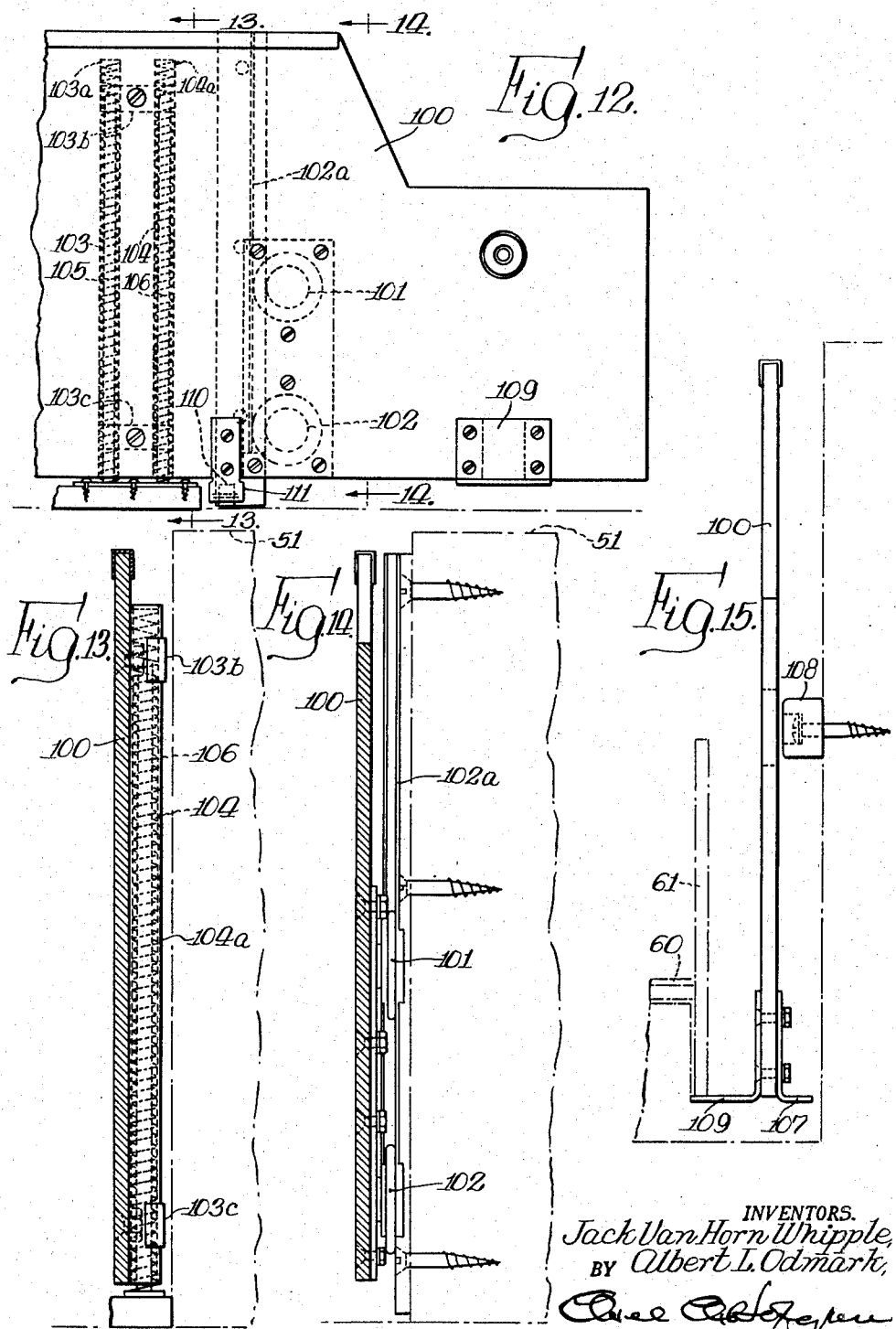

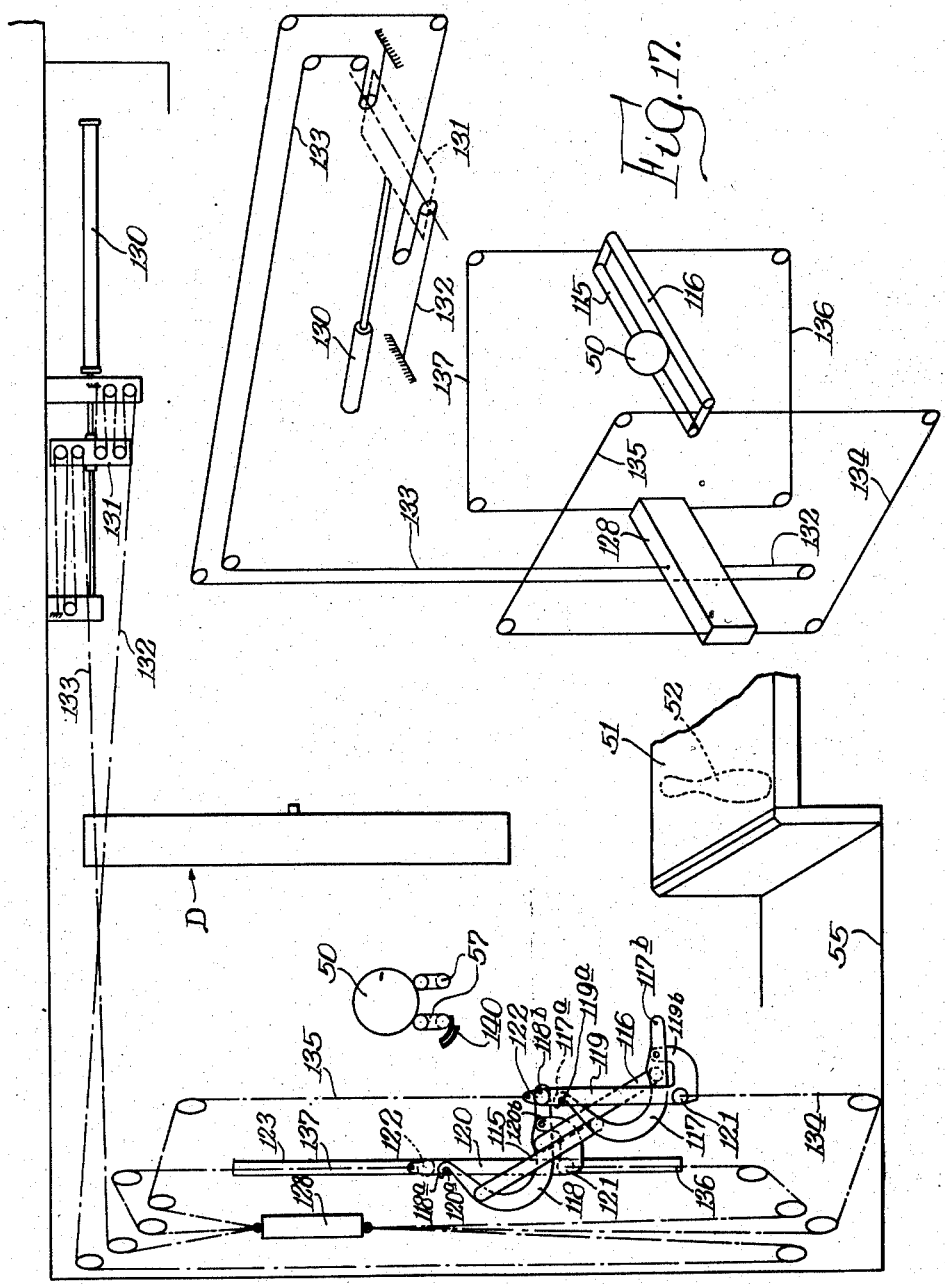

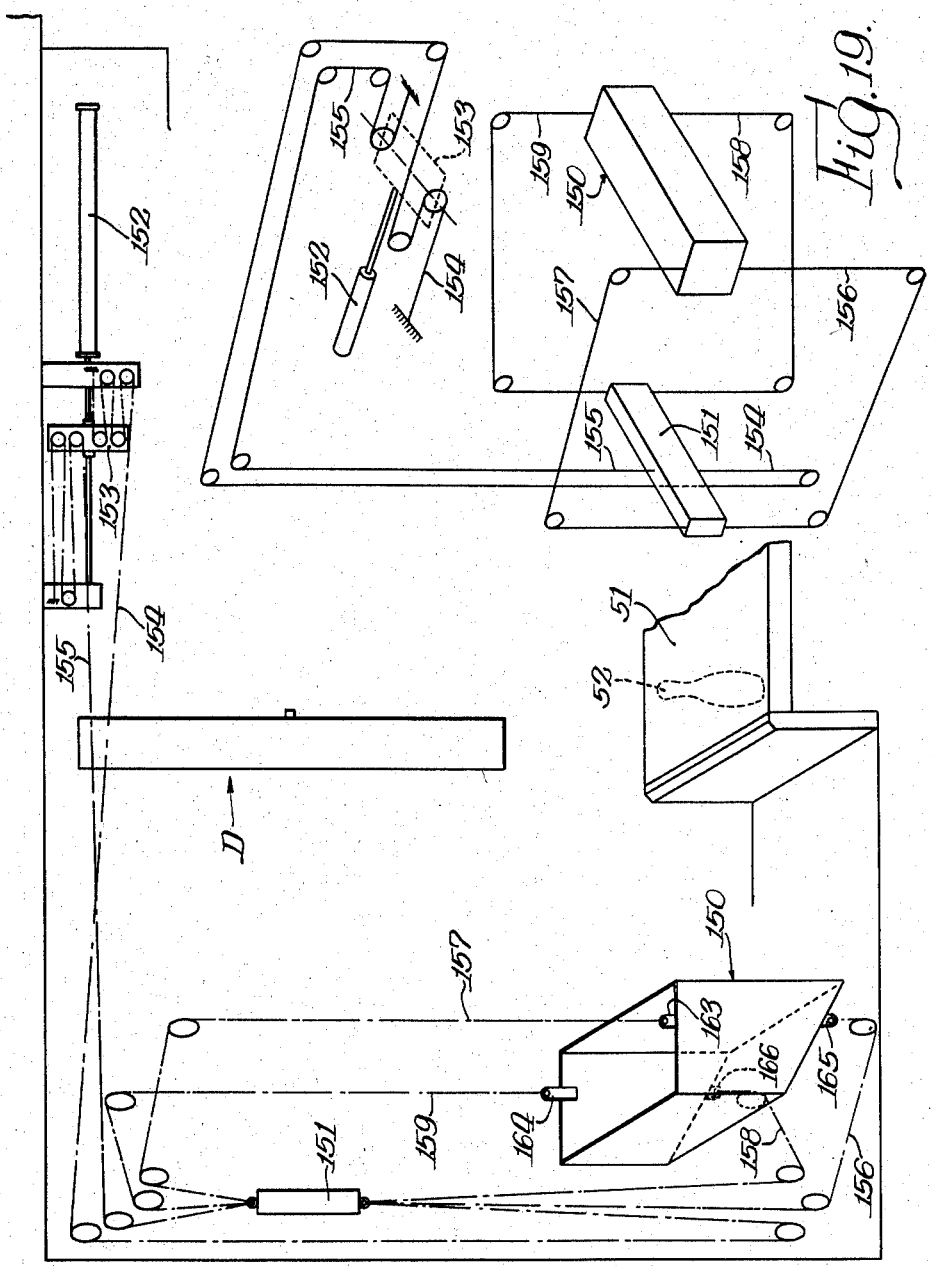

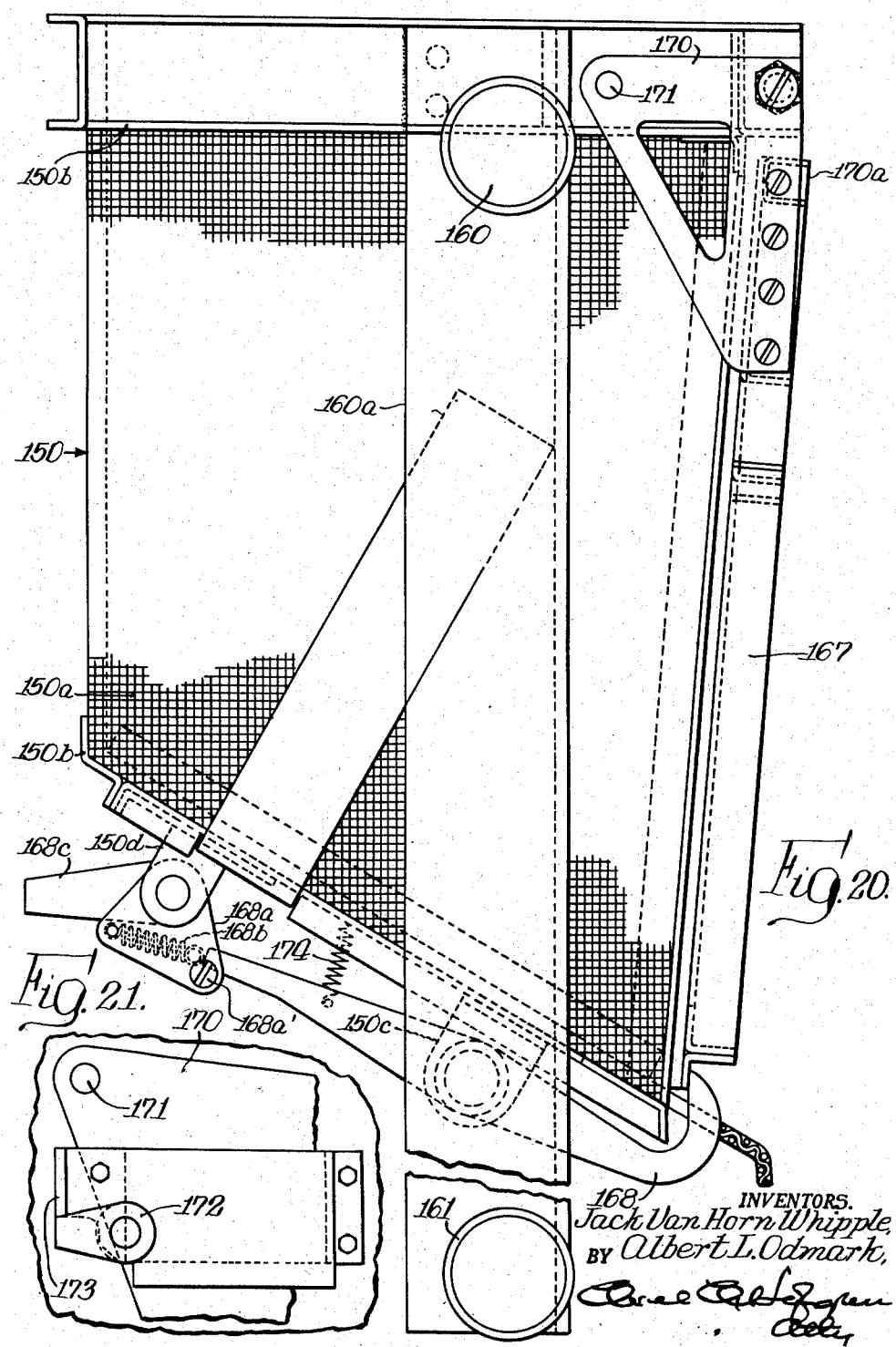

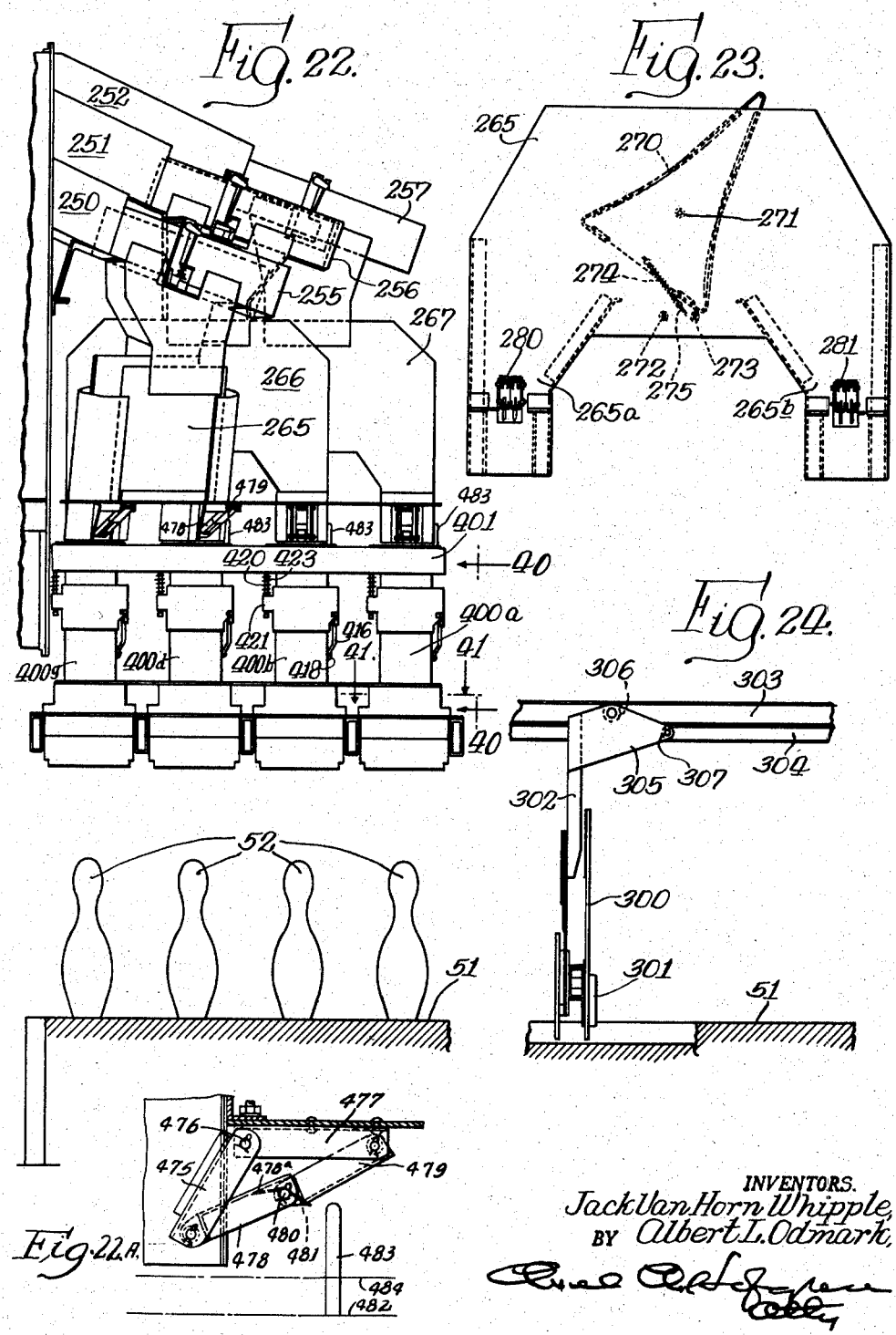

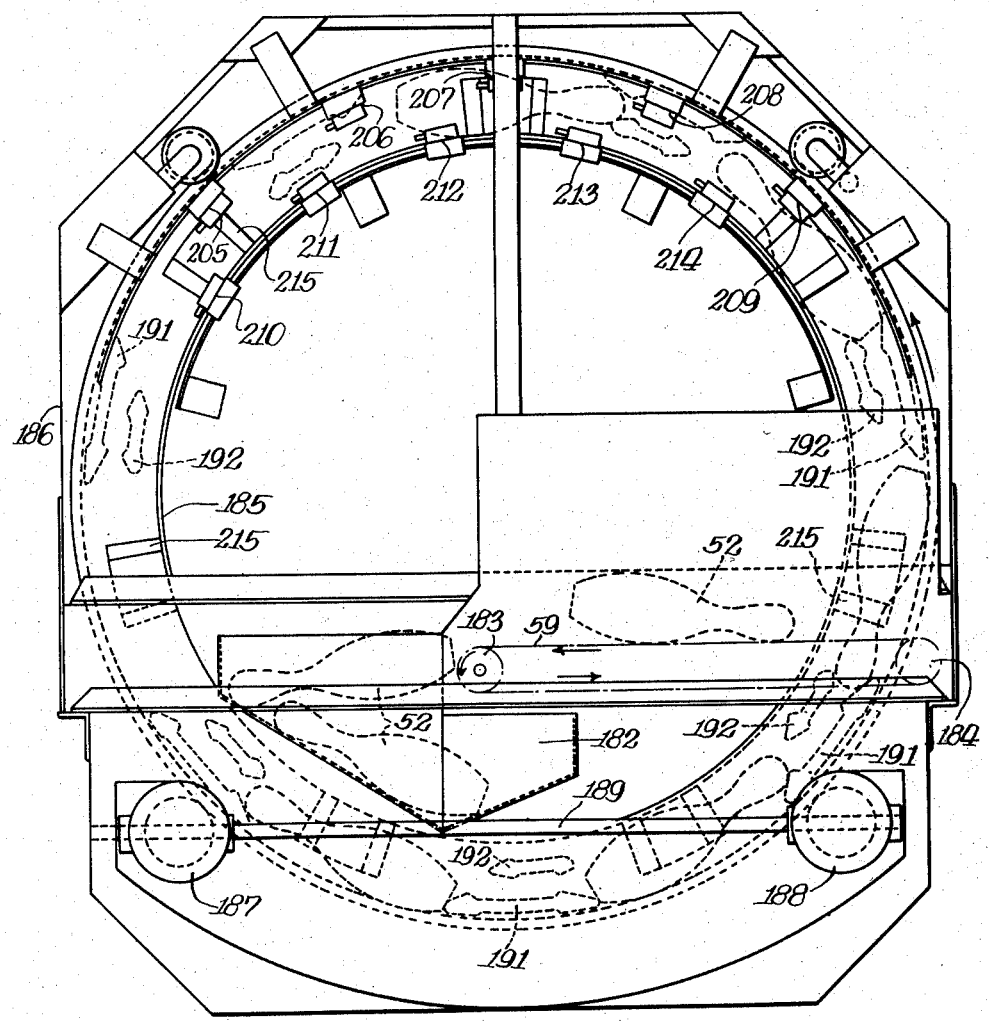

May 19, 1959  J. VAN HORN WHIPPLE ET AL  2,887,318
BOWLING PIN HANDLING APPARATUS

Original Filed March 24, 1947  26 Sheets-Sheet 14

INVENTORS.
Jack Van Horn Whipple,
BY Albert L. Odmark,

May 19, 1959  J. VAN HORN WHIPPLE ET AL  2,887,318
BOWLING PIN HANDLING APPARATUS
Original Filed March 24, 1947  26 Sheets-Sheet 15
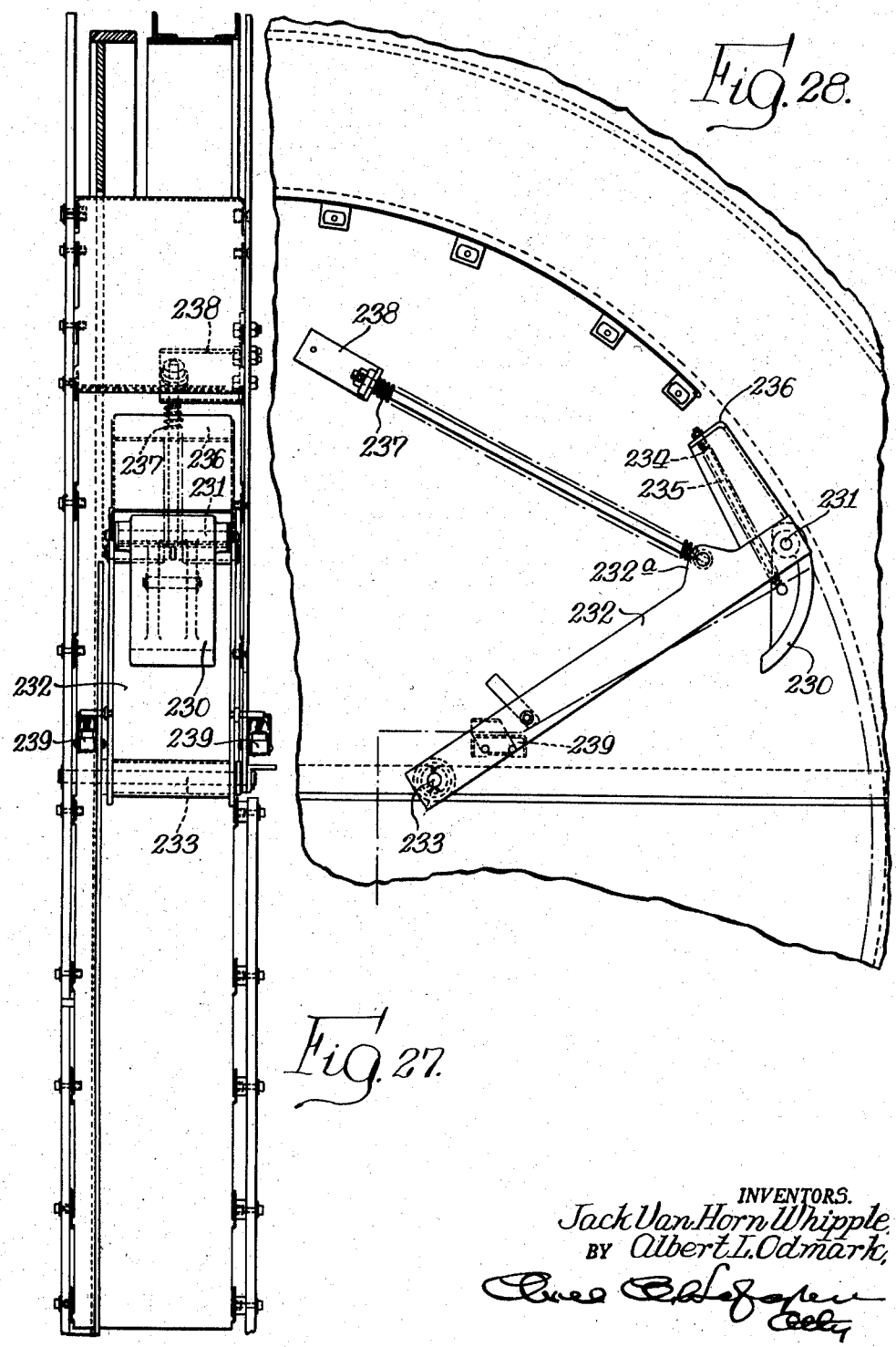
INVENTORS.
Jack Van Horn Whipple,
BY Albert L. Odmark,

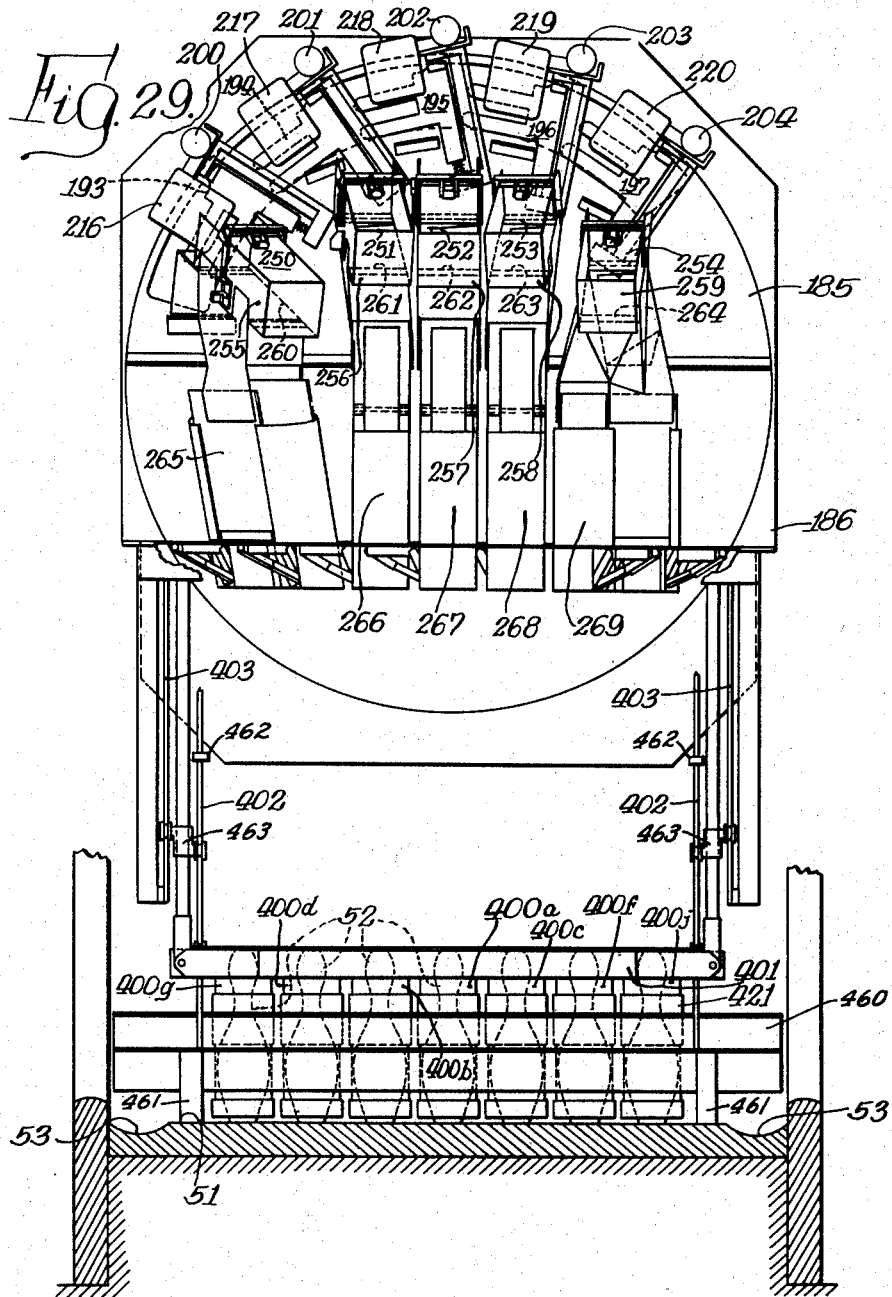

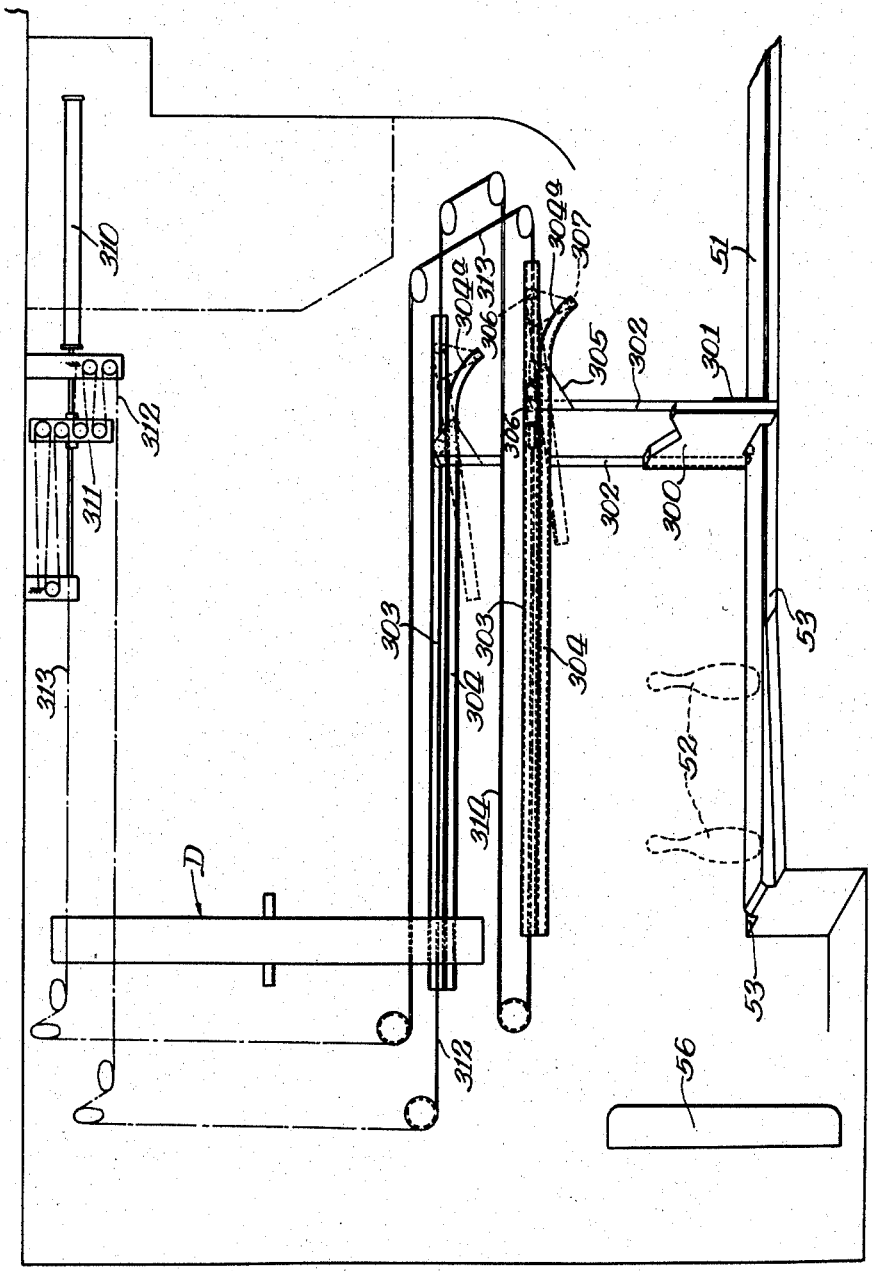

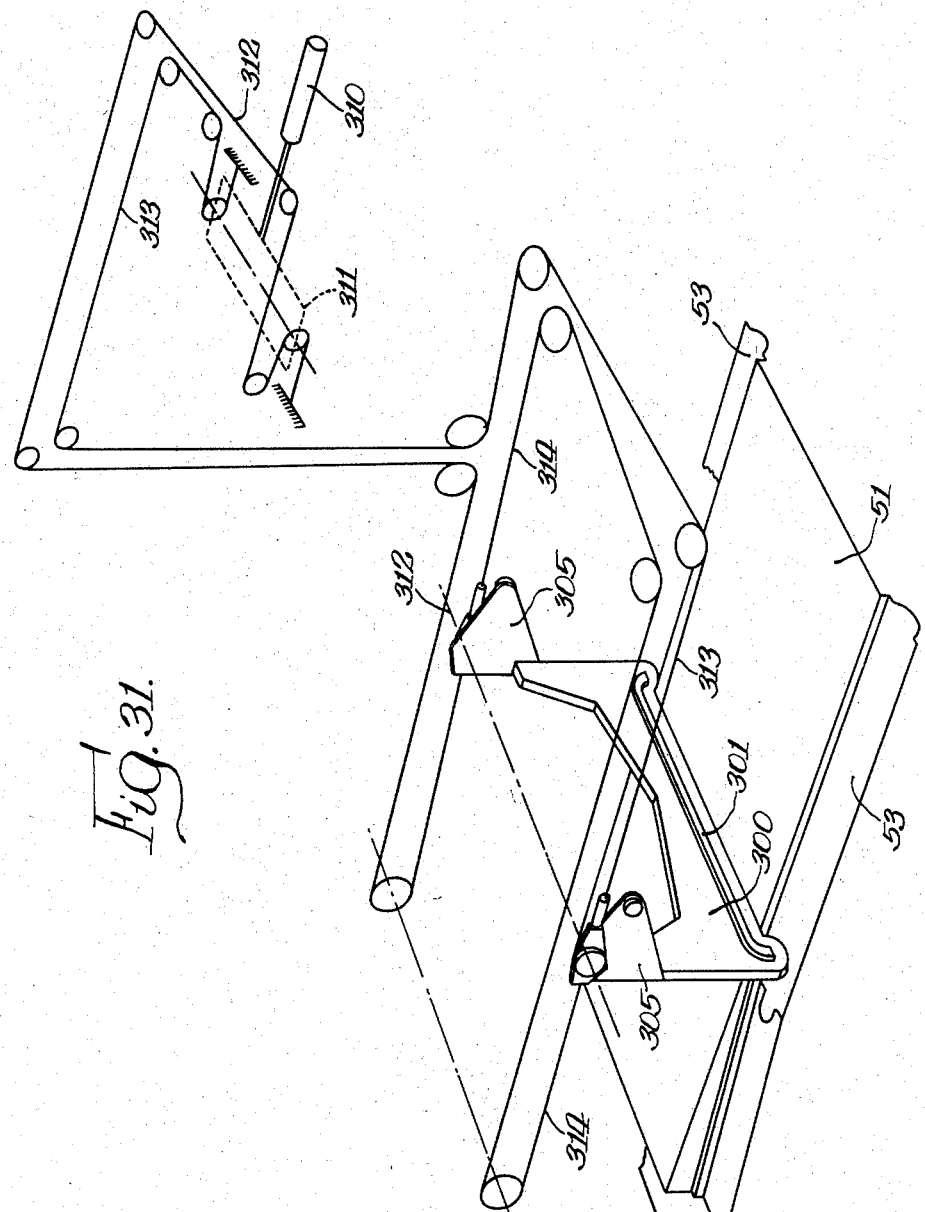

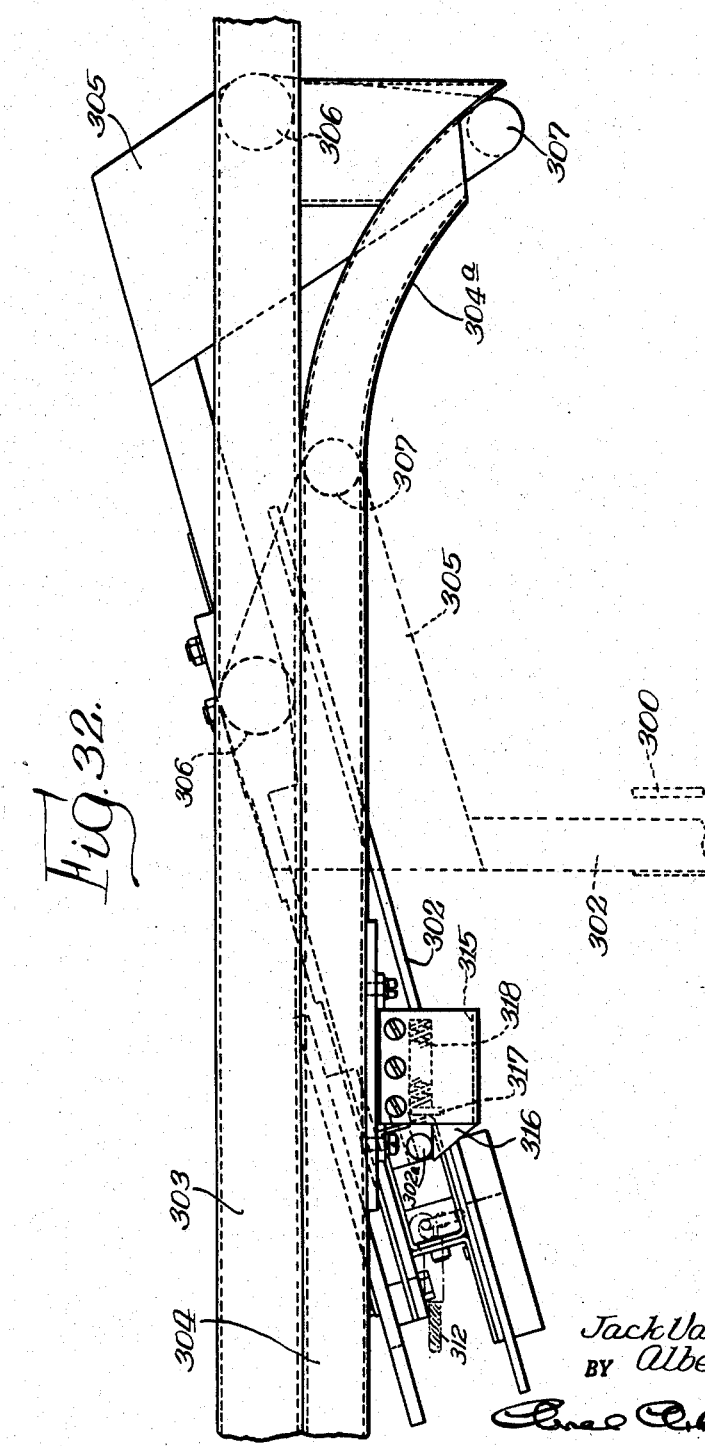

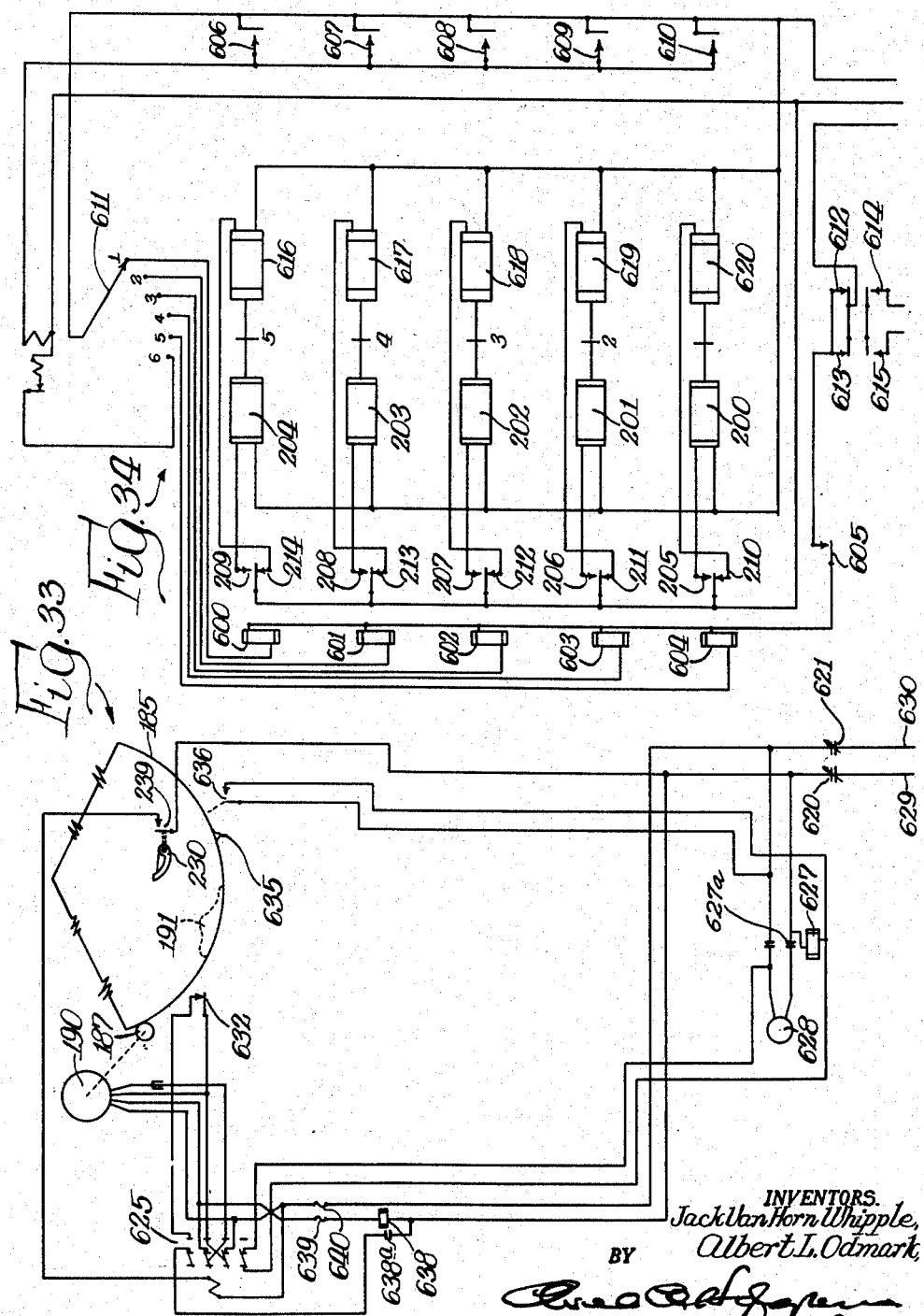

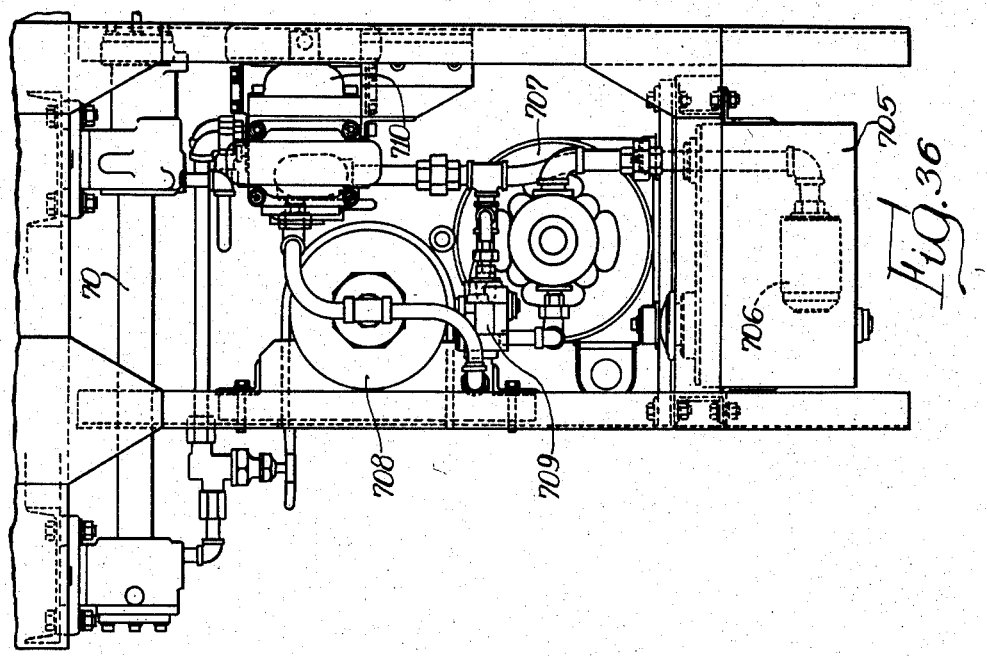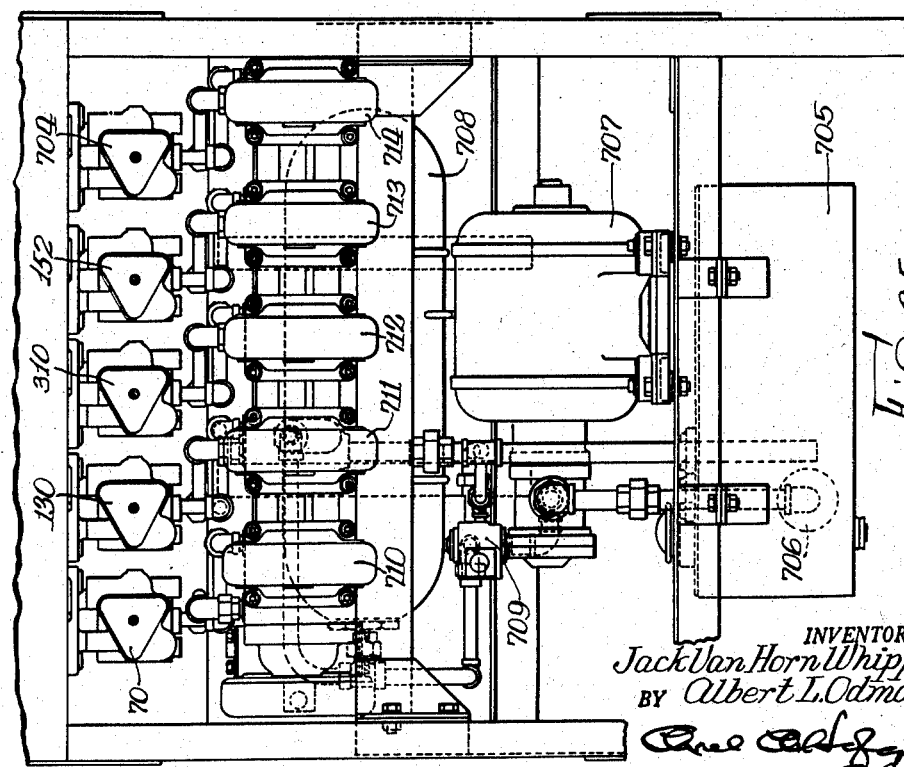

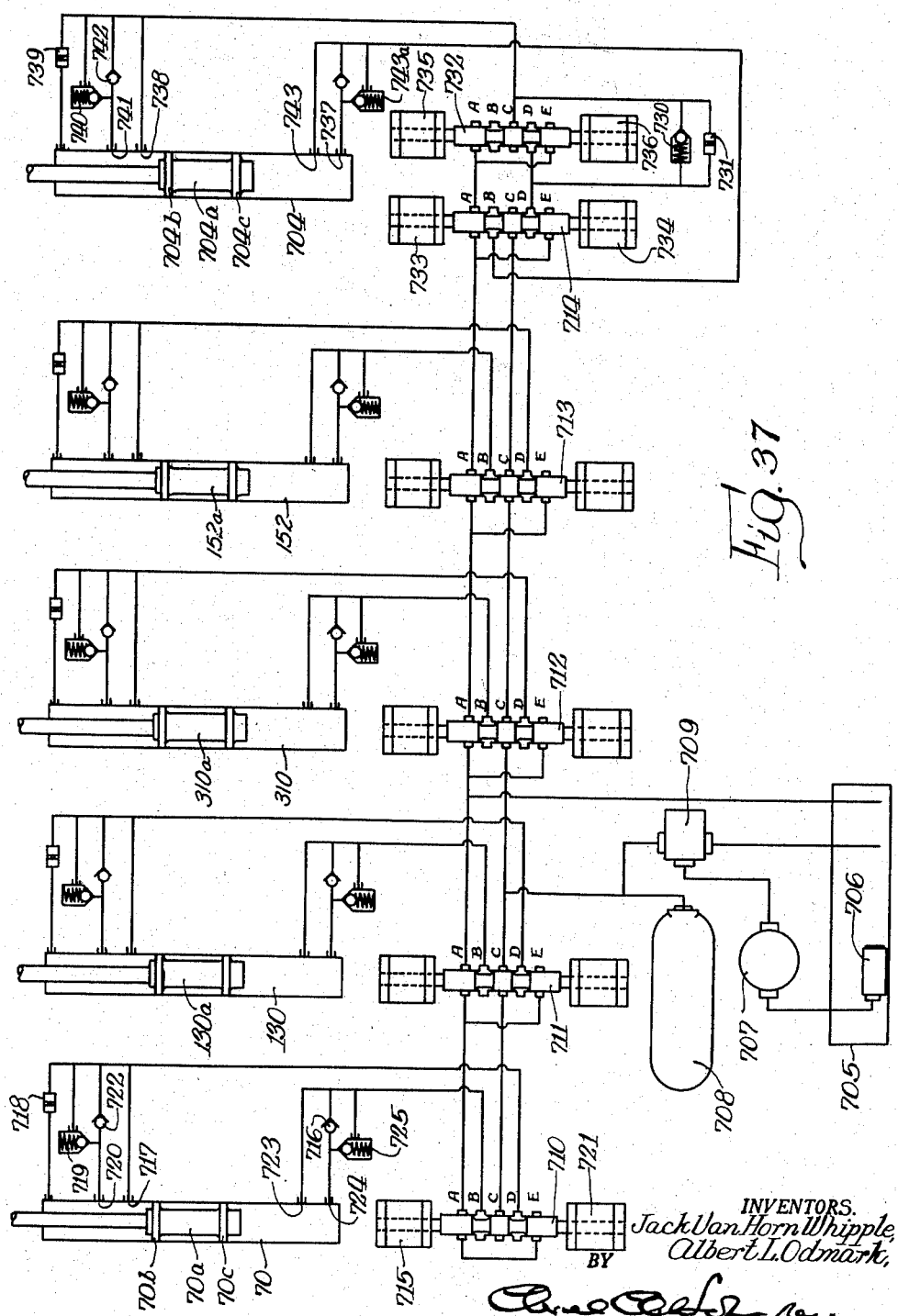

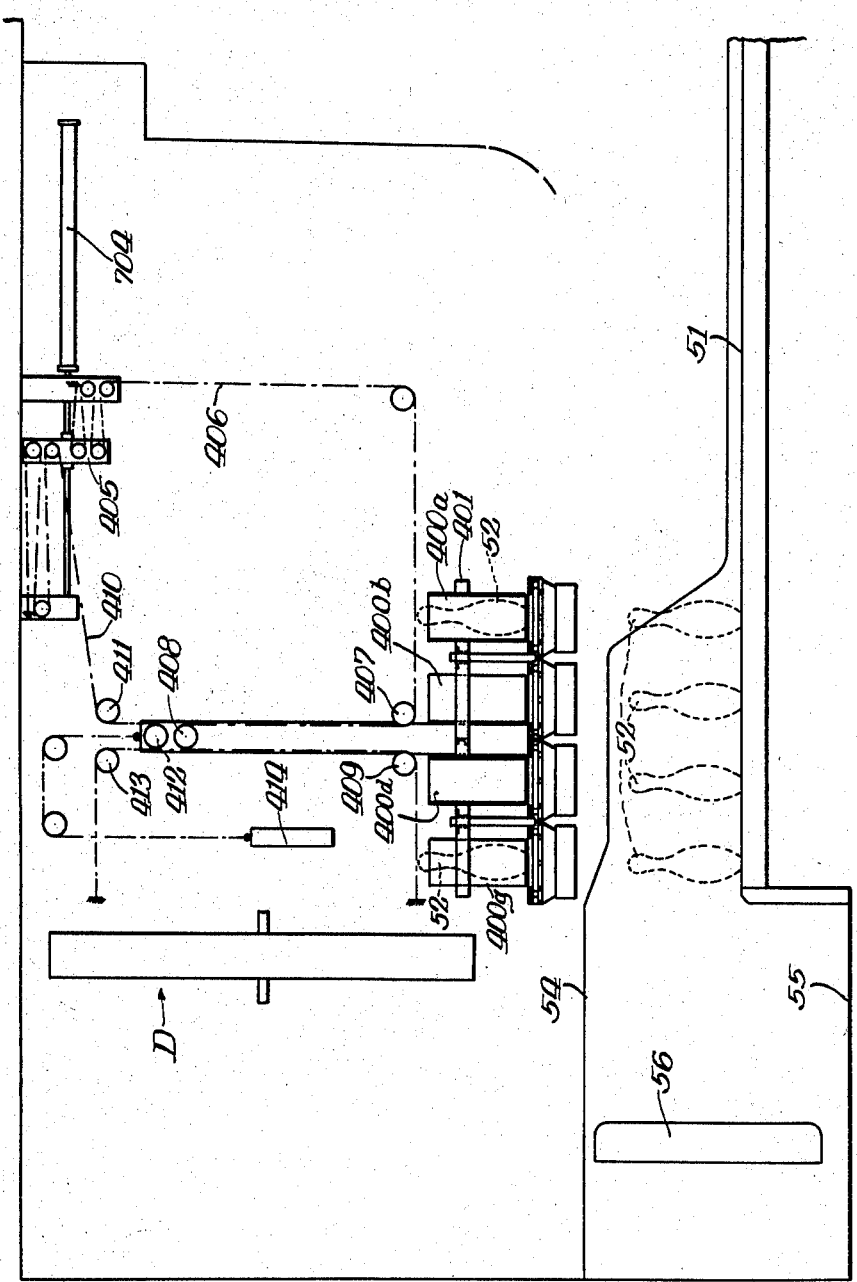

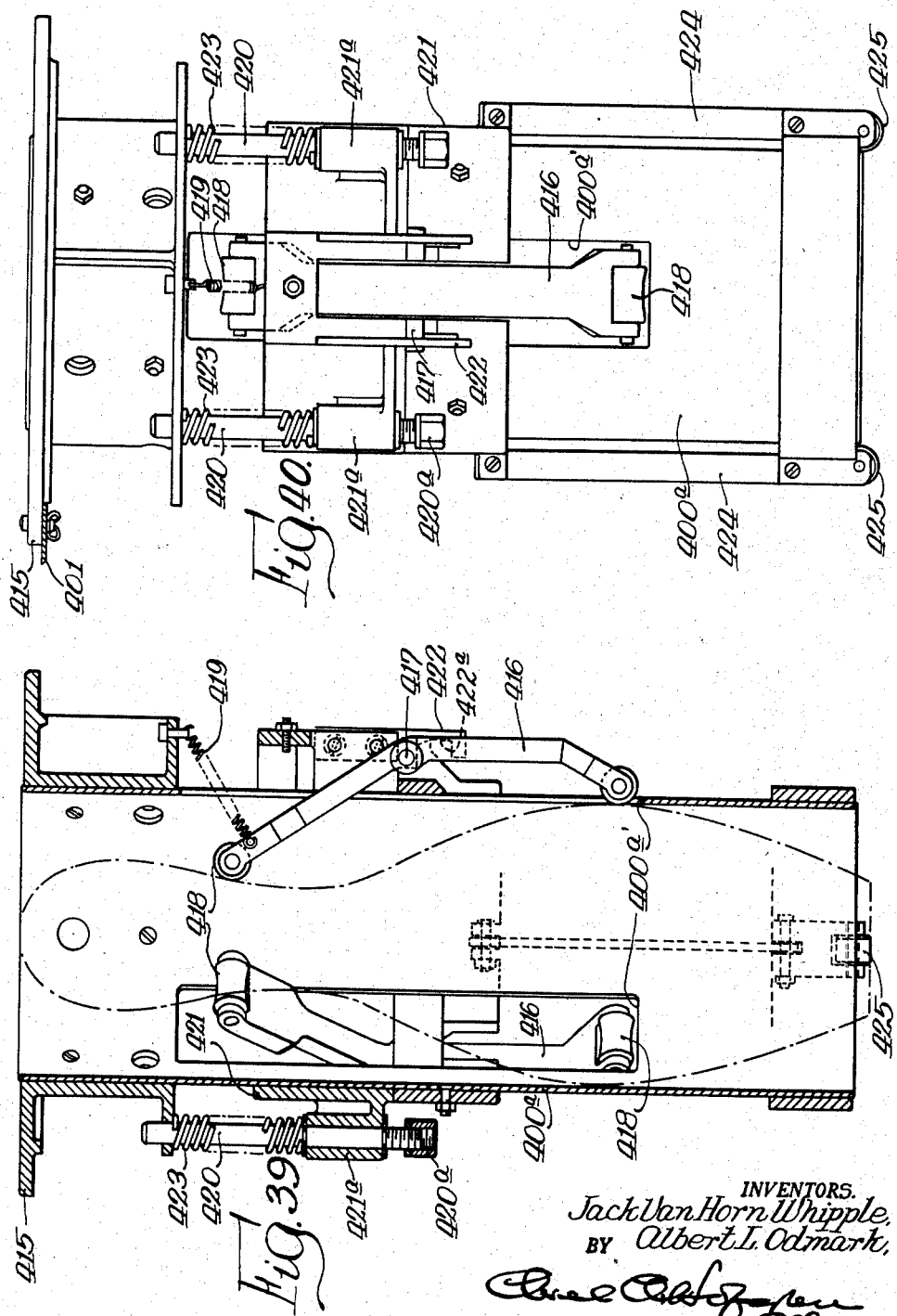

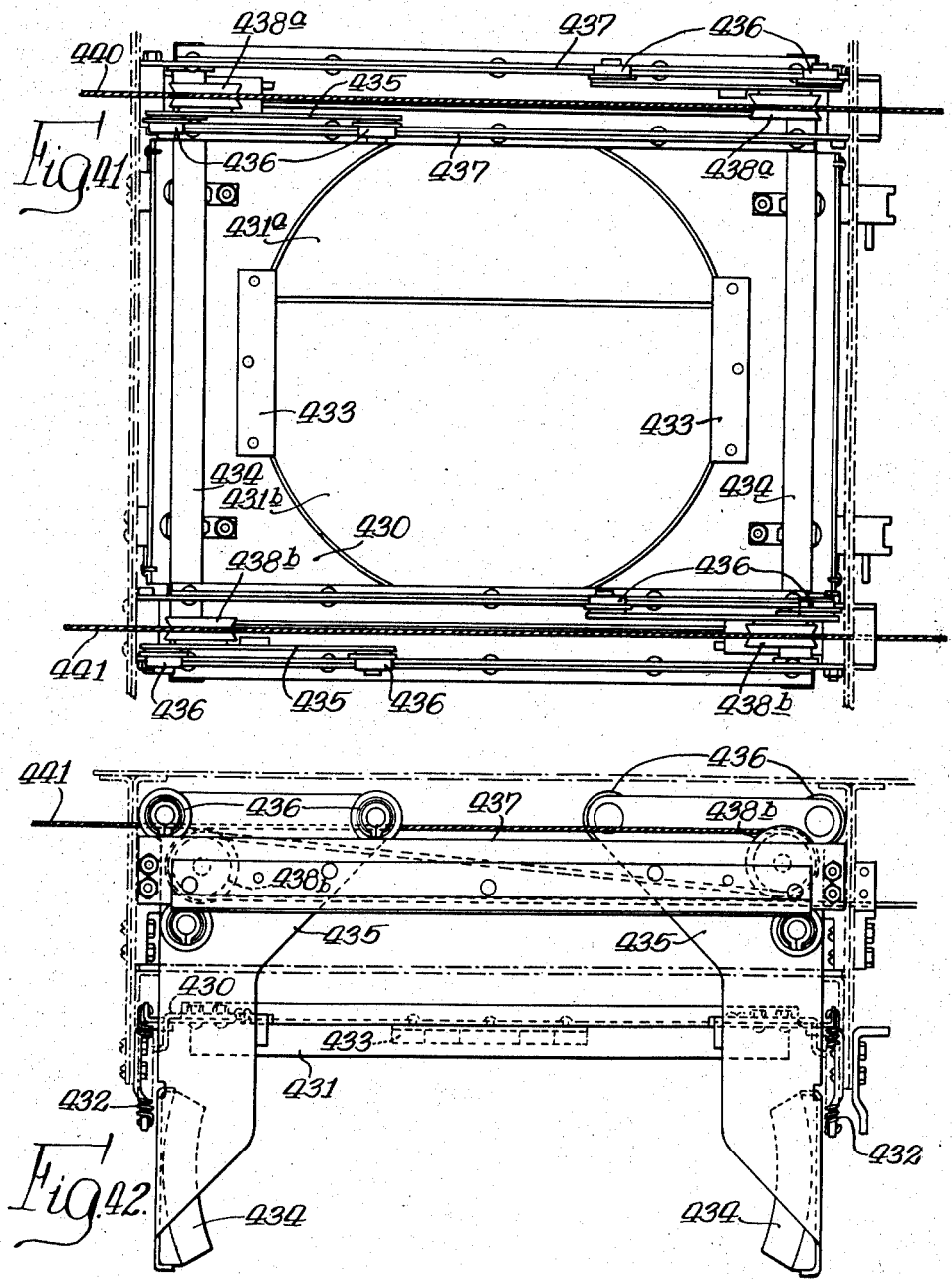

May 19, 1959 J. VAN HORN WHIPPLE ET AL 2,887,318
BOWLING PIN HANDLING APPARATUS
Original Filed March 24, 1947 26 Sheets-Sheet 26
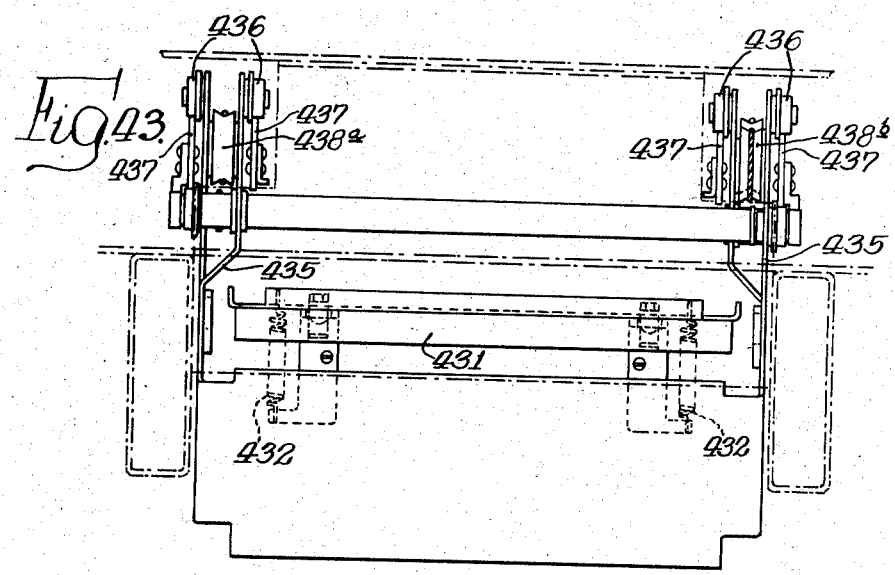
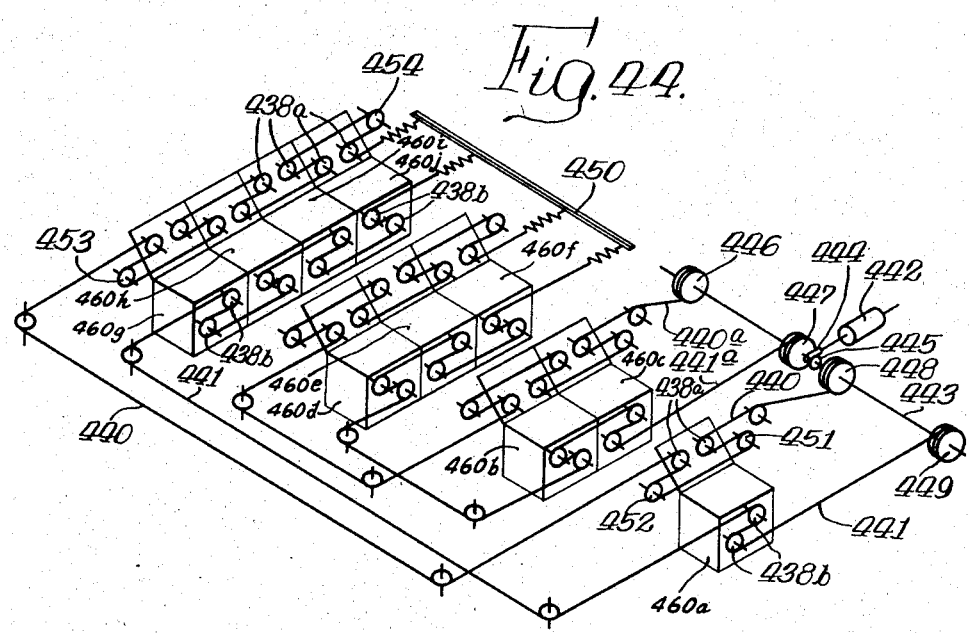
INVENTORS.
Jack Van Horn Whipple,
BY Albert L. Odmark,

United States Patent Office 2,887,318
Patented May 19, 1959

2,887,318

BOWLING PIN HANDLING APPARATUS

Jack Van Horn Whipple and Albert L. Odmark, New York, N.Y., assignors to The Brunswick-Balke-Collender Company, Chicago, Ill., a corporation of Delaware Original application March 24, 1947, Serial No. 736,682, now Patent No. 2,676,016, dated April 20, 1954. Divided and this application April 9, 1954, Serial No. 425,009

13 Claims. (Cl. 273—43)

This invention relates to a pinsetter, and more particularly to a pinsetter which is completely automatic in its operation.

This application is a division of our application, Serial No. 736,682, filed March 24, 1947, now Patent No. 2,676,016, issued April 20, 1954.

The general object of the invention is to provide a new and improved automatic pinsetter for bowling alleys.

An object is to provide in such a machine a rotatable drum-like pin sorter rotatable about a horizontal axis, a conveyor belt for delivering pins into said drum, and means for receiving pins from a pin elevating basket when the basket is elevated and operable to guide the pins onto said belt.

Another object is to provide in such a machine a pin sorting drum having an axial internal length not greatly in excess of the largest diameter of a pin, and means spaced uniformly about the inner peripheral wall thereof operable to engage pins singly, and a plurality of discharge openings adjacent the upper portion of the drum.

Another object is to provide in such a machine having a rotary drum sorter, means normally driving the sorter in a forward direction and means operable in the event pins jam in a discharge opening or elsewhere in the sorter to back up the sorter and disengage the pins.

Another object is to provide in such a machine a vertically movable pinsetting mechanism positioned above the portion of the alley on which the pins are to be set, and novel mechanism for receiving the pins from the sorter drum and feeding them to the pinsetter, such mechanism comprising a plurality of delivery chutes leading from the upper portion of the sorter and extending downwardly and forwardly therefrom and having bottom discharge openings at their forward ends, means adjacent the forward end of each delivery chute for insuring the discharge of the pins therefrom with the head ends up, a plurality of pin distributing devices, one associated with each of the delivery chutes and each having two discharge channels leading to pin positions on the pinsetter, and means adjacent the entrance of each distributing device operable by the weight of the pins engaging therewith to direct pins alternately to the two discharge channels.

Other objects and advantages will become apparent from the following detailed description taken in connection with the accompanying drawings, in which:

Figure 2A is an enlarged plan view of a portion of the pin distributing apparatus, showing the door and tripping mechanism in one of the pin distributing chutes;

Figure 2B is an elevation of the apparatus shown in Figure 2A;

Figure 2C is an end view of the apparatus shown in Figure 2A;

Figure 6 is a diagrammatic representation, partly schematic, of the ball and pin receptacle, the receptacle being shown in its lower terminal position in solid lines and in its upper terminal position in broken lines;

Figure 7 is a schematic representation of the hydraulic operating mechanism, cabling and reeving utilized to operate the ball and pin elevating receptacle;

Figure 8 is a fragmentary plan view of a portion of the ball and pin elevating receptacle, hidden parts being shown in broken lines;

Figure 9 is a vertical section taken on the line 9—9 of Figure 8;

Figure 10 is a side elevation of the apparatus shown in Figure 8, hidden parts being shown in broken lines for clarity;

Figure 11 is a vertical section taken on the line 11—11 of Figure 10;

Figure 12 is a fragmentary view of the baffle structure in our improved machine, hidden parts being shown in broken lines for clarity;

Figure 13 is a vertical section through the baffle taken on the line 13—13 of Figure 12;

Figure 14 is a vertical section through the baffle taken on the line 14—14 of Figure 12;

Figure 15 is an end view of the baffle looking from the right of Figure 12;

Figure 16 is a diagrammatic representation, partly schematic, of the ball carrier apparatus;

Figure 17 is a schematic representation of the ball carrier apparatus showing the hydraulic apparatus, and the cables and reeving arrangement;

Figure 18 is a diagrammatic representation, partly schematic, of the pin basket;

Figure 19 is a schematic representation of the pin basket showing the hydraulic apparatus, and the cables and reeving arrangement;

Figure 20 is a detail view of the pin basket showing the door operating mechanism;

Figure 21 is a detail view of the door opening cam and its supporting structure;

Figure 22 is an elevation of a portion of the machine showing the pin distributing chutes and the pinsetter mechanism;

Figure 26:
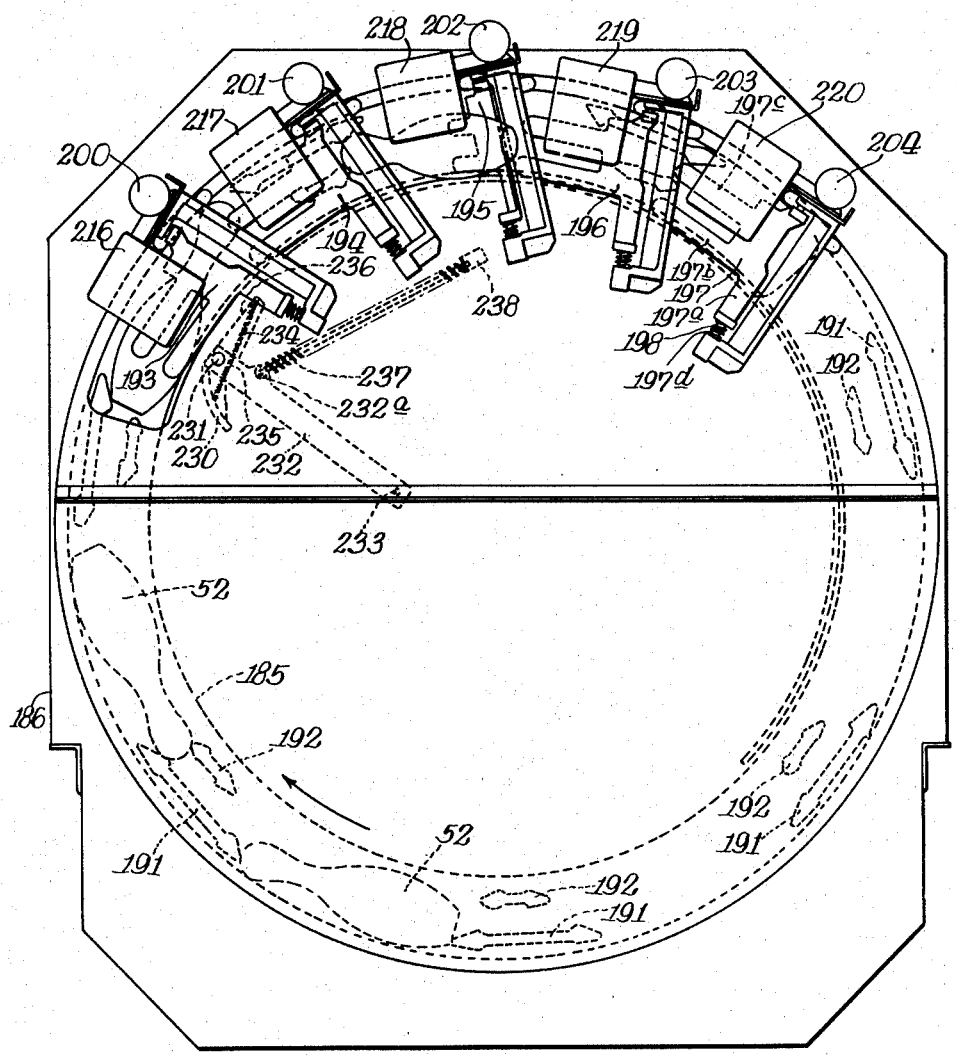

Figure 22-A is an enlarged fragmentary elevation of a portion of one of the pin chutes showing the door mechanism at the bottom thereof;

Figure 23 is a detail view of one of the pin distributing boxes and the pin switch therein;

Figure 24 is a fragmentary view showing the sweep in its lowered position;

Figure 25 is a view of the rotary pin sorter, looking from the rear, hidden parts being shown in broken lines for clarity;

Figure 26 is a front view of the sorter, hidden parts being shown in broken lines for clarity;

Figure 27 is a fragmentary vertical section through the rotary pin sorter showing the anti-jam mechanism;

Figure 28 is an enlarged rear view of a portion within the rotary pin sorter showing the anti-jam mechanism in detail;

Figure 29 is a front view showing the pin distributing chutes and their relation to the alley bed, and showing the pinsetting mechanism in lowered position;

Figure 30 is a diagrammatic representation, partly schematic, of the sweep mechanism and its operating apparatus;

Figure 31 is a schematic representation showing the hydraulic operating apparatus for the sweep mechanism together with the cables and reeving for said mechanism;

Figure 32 is a fragmentary enlarged view showing the sweep in cammed up position, and showing its latching mechanism;

Figure 33 is a wiring diagram showing one arrangement which may be utilized to reverse the direction of rotation of the hopper in the event that a pin jams therein;

Figure 34 is a wiring diagram of the electrical apparatus which operates the hopper ejector doors;

Figure 35 is a view of the hydraulic mechanism employed in our machine, looking from the front;

Figure 36 is a view of such hydraulic mechanism looking from the left of Figure 35;

Figure 37 is a schematic diagram of the hydraulic mechanism;

Figure 38 is a diagrammatic representation, partly schematic, of the pinsetter and pick-up apparatus;

Figure 39 is a vertical section taken through one of the pinsetter units;

Figure 40 is a vertical section through the pinsetter taken at right angles to Figure 39 and on the line 40—40 of Figure 22, and showing an outside view of one of the pinsetter tubes.

Figure 41 is a horizontal section through one of the search units taken on the line 41—41 of Figure 22;

Figure 42 is a side view of the search bar unit assembly shown in Figure 41;

Figure 43 is a side view of the assembly of Figure 42, taken at right angles thereto; and Figure 44 is a schematic representation showing the cable and reeving arrangement for operating the search bars of the pickup unit.

While our invention is susceptible of embodiment in many different forms, we have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

While the machine illustrated, described, and claimed herein is shown as constructed on a conventional bowling alley, and is described and claimed as a "bowling" machine, it will be understood that the machine is equally applicable for use in games other than the game conventionally known as bowling, and it will be understood that the term "bowling" as used herein is meant to include the game known as duck pins, and other games similar to the game conventionally known as bowling.

Referring to the drawings, the general operation of the machine will be first set forth briefly.

Figure 1:
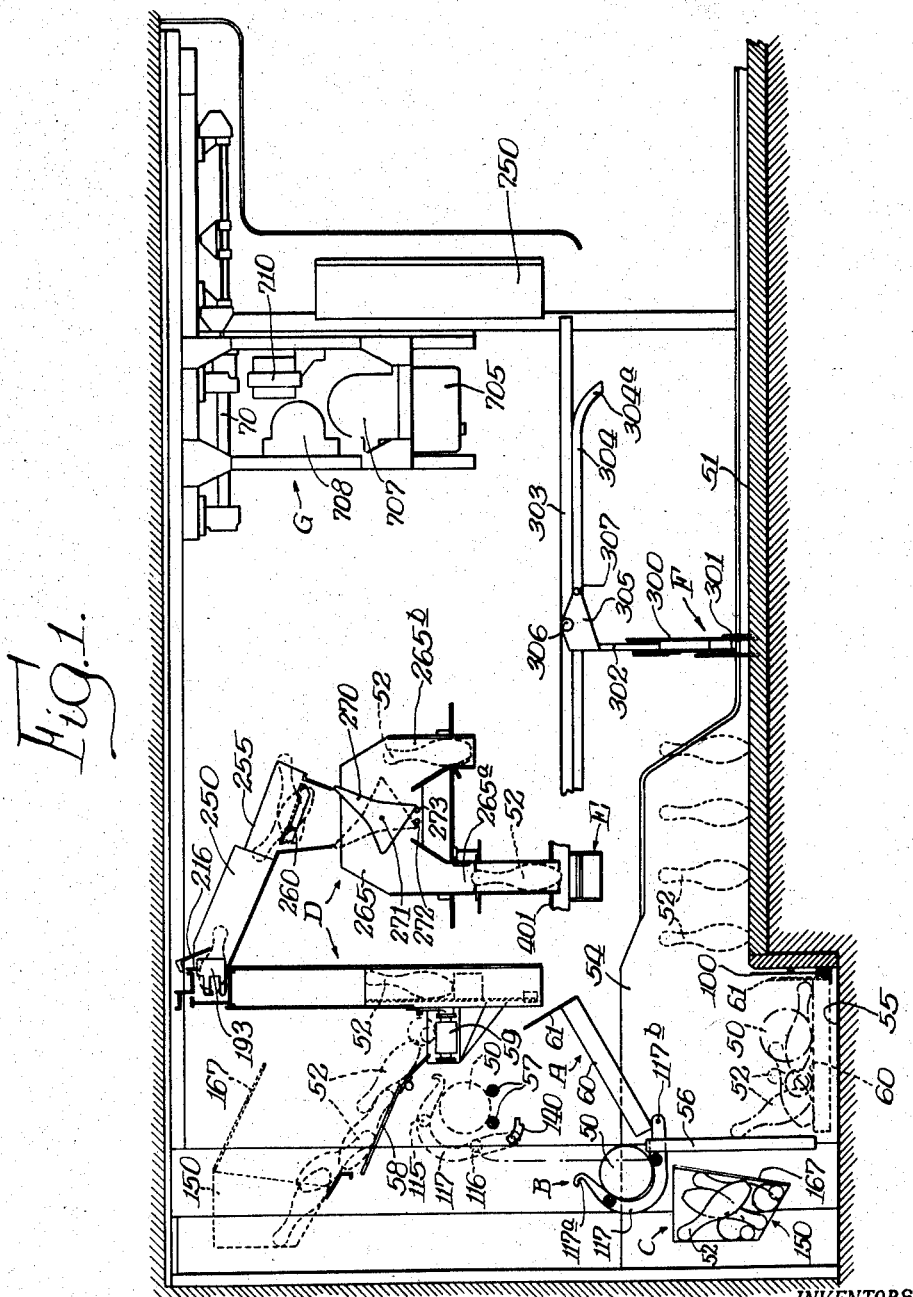
Figure 1 is a longitudinal section through a bowling alley having our improved machine installed thereon, the various operating mechanisms comprissing our machine being shown in fragmentary form for greater clarity.

Figure 1 shows in fragmentary form the basic mechanisms which constitute the machine, such mechanisms comprising a pin and ball elevating means designated generally at A, a ball carrier designated generally at B, a pin elevating basket designated generally at C, a pin sorter and distributing mechanism designated generally at D, a pinsetting means designated only very fragmentarily at E, an alley clearing or sweeping mechanism designated at F, and a power mechanism designated at G.

Each of the mechanisms A, B, and C are shown in Figure 1 in solid lines in one terminal position and in dotted lines in another terminal position.

In operating our improved pinsetting machine, a ball, as the bowling ball 50, is rolled along a conventional alley bed 51 which is adapted to hold a set of pins, as the bowling pins 52. At each side of the alley are conventional gutters 53 and side walls or "kick backs" 54, and behind the alley is a conventional pit 55 into which the pins and ball may drop.

Within the pit is located a ball and pin elevating mechanism indicated generally at A for receiving a ball and fallen pins, and back of this is a pit cushion 56. The ball and pin elevating mechanism is adapted to be raised with its load of ball and pins to a point adjacent the top of the pit cushion, and then tilted so that the ball and pins are discharged to the rear of said pit cushion. The ball rolls onto a ball carrier indicated generally at B and the pins fall through the carrier into the pin elevating mechanism indicated generally at C. Means are provided to raise the ball carrier to a point adjacent a ball return track 57 and to deposit the ball on said track, and said ball is carried by the return track to the players' end of the alley. The pin elevating basket C is adapted to lift the pins to a point above the ball return track where they are dumped onto a sloping receiving board 58 and slide down onto a moving conveyor or dribble belt 59 which carries them in succession into the pin sorting and distributing mechanism D from whence they are delivered in proper position to the pinsetting means E. At the end of a bowling frame the pinsetting system resets the pins on the alley in proper playing position.

During the operation of the machine the sweep mechanism F, which normally dwells above the alley bed, moves down to the alley bed as shown in Figure 1 and acts as a guard to prevent additional balls which might be rolled while the machine is in operation from striking the pinsetting mechanism.

We have devised and are here disclosing novel apparatus for efficiently performing in an automatic pinsetting machine the functions set forth above. In addition our improved pinsetting machine is adapted to pick up the standing or "spare" pins after a first ball has been rolled, clear the alley of fallen pins, and reset the spare pins preparatory to the rolling of a second ball, and to clear the alley of standing and fallen pins and position a full set of pins upon the alley at the end of a frame either after the second ball is thrown or after a strike has been made with the first ball.

*Ball and pin elevating mechanism*

After a ball has been rolled and any spare pins are picked up, the sweep F (Fig. 1) operates to clear the alley and push into the pit 55 any fallen pins which remain on the alley bed. The ball and fallen pins are caught by a receptacle A (Figs. 1, and 4 to 10) which lies in the pit in front of the pit cushion. In order to raise the ball and pins this receptacle is given an upward motion of about 37 inches and then is tilted toward the rear of the alley in order to discharge its contents as illustrated in Figs. 1, 5 and 6.

The receptacle A includes a ball and pin tray comprising a normally horizontally disposed bottom member 60 and a front member 61 extending substantially at right angles to said bottom member and normally located adjacent the end of the alley bed with its top surface below the surface of the alley bed so that no obstruction is presented to balls or pins as they fall into the pit. The bottom member 60 of the tray substantially covers the floor of the pit in front of the pit cushion and extends close to the kickbacks on either side of the alley so that balls and pins which fall from the alley bed into the pit are caught by the tray and cannot escape therefrom until the latter has been raised above the top of the pit cushion and tilted. The tray comprising the members 60 and 61 is pivotally and slidably mounted in an outer frame (Figs. 5, 6, 8 and 10) consisting of two L-shaped brackets 62 and 63, said brackets being laterally positioned adjacent opposite walls of the pit structure and extending rearwardly and upwardly from the tray. Each of the brackets 62 and 63 carries a pair of rollers 64 which run in a guiding track 65 (Fig. 6) on the inner face of one of the pit structure walls. At the upper and lower ends of these brackets are fastenings 66 to receive the ends of cables 74, 75, 76 and 77 which raise and lower the receptacle, this movement being aided by the counterweight 67, as shown in Figs. 6 and 7. The horizontal portions of each of the L-shaped brackets 62 and 63 are joined by a cross bar 68 on the ends of said brackets which are at the front or next to the alley, thus forming a rigid supporting structure for the tray 60.

The means for raising and lowering the ball and pin receptacle A is shown schematically in Figure 7 where the action of a hydraulic piston and cylinder device 70 moves a reeving carriage 71 forwardly and backwardly. A pair of cables 72 and 73 are anchored adjacent the reeving carriage and connected at their other ends to the counterweight 67, and it will be seen that movement of the carriage to the left in Figure 7 will result in paying out the cable 72 and pulling in the cable 73 to cause the counterweight to move upwardly, while movement of the reeving carriage to the right will cause the counterweight to move downwardly. The bracket 62 is connected to the counterweight by means of cables 74 and 75, and the bracket 63 is connected to the counterweight by means of the cables 76 and 77 so that movement of the counterweight in one direction results in movement of the receptacle A in the opposite direction.

Figure 5:
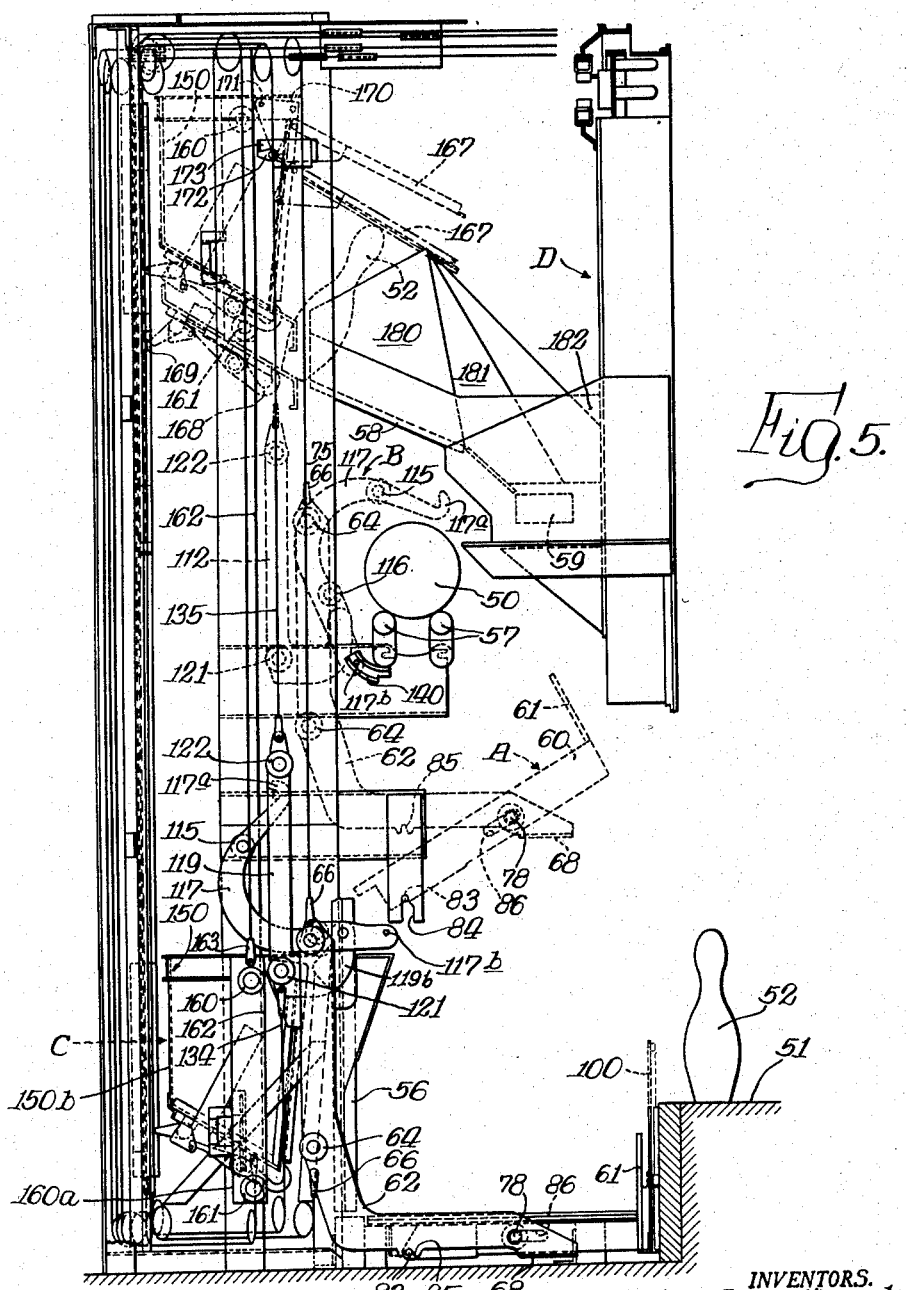
Figure 5 is an enlarged view showing the mechanisms of our improved machine in an above the pit of a bowling alley, certain of the apparatus being shown in one terminal position in solid lines and in another terminal position in broken lines.

Referring again to the structure of the ball and pin elevating receptacle as shown in Figs. 5, 8, 10 and 11, a freely turning shaft 78 extends between the brackets 62 and 63 below the tray member 60, a pair of gears as the gear 79 are pinned to said shaft, and outside of said gears is a pair of freely turning rollers as the roller 80. The rollers lie between the flanges of a pair of short channel shaped tracks or guides as the guide 81 which are integral with a pair of tray frames as the frame 82 which are connected to the bottom member 60. The channel shaped guides 81 on the frame 82, engaging as they do the rollers 80 on the cross shaft 78 carried by the brackets 62 and 63, enables the tray frames 82 to be tilted for emptying at the upper end of its stroke which occurs when the pins 83 on the outer side of the frames 82 engage a pair of fixed cams 84 on the supporting structure, as shown in Figs. 5 and 6.

Until this action occurs the pins 83 are engaged by notches 85 in each of the outer bracket members (see Fig. 10), this arrangement serving to position the tray 60 longitudinally so that it clears both the pit cushion and the front wall of the pit.

As the bracket members 62 and 63 which carry the tray continue to rise after the pins 83 are engaged in the cams 84, it is obvious that the tray will tilt in a backward direction about the axis of the pins 83. It is to permit this relative movement that the channel tracks 81 have been provided on the tray frame 82 and that the slotted apertures 86 are provided on the bracket members 62 and 63.

In order to insure that both ends of the tray move equally, racks 87 (Figs. 8 and 11) are adapted to engage the gears 79 carried by the cross shaft.

Means have also been provided to restore the tray to a horizontal position after tilting and to hold up the rear end of the tray under the load of pins and balls that it carries, or in other words to prevent it from tilting until it is engaged by the cam 84 and to permit tilting when so engaged. To accomplish these functions a pair of cables 90 (Figs. 8 to 10) each have one end attached to a pin 91 fixed to each of the brackets 62 and 63 of the outer frame. Each cable leads downwardly and about a sheave 92 which turns upon a pin 93 carried by the tray frame 82. From these sheaves each of the cables passes about another sheave as the sheave 94 which is obliquely placed and is also secured to the tray frame 82 so that when the cables are brought around these respective sheaves the cables may be brought into the same line transversely across the tray frames beneath the bottom member 60.

Concentrically with the line of the cables there is attached beneath the bottom member 60 and spaced therefrom and extending transversely of the alley a tube 95 which serves as an inner support for a plurality of coiled springs 96. These springs are arranged to be compressed by the pulling of the cables due to the tilting of the tray. In order to effect this the free end of each of the two cables 90 is attached to the base portion of a long U-shaped loop 97, only one of such loops being shown in Figures 8 and 9. Each of these two loops may be made of stout wire, and each loop passes through the tube within the springs to the opposite side of the alley from the side on which the cable is fastened, these two loops lying in planes at right angles to each other in order to avoid interference with each other. The outer ends of each of the loops is attached to a ring as the ring 98 of Fig. 9, each of said rings lying outside the tube against one end of the springs. To permit the attachment of the loop which is inside the tube to the ring which is outside the tube the ring has been provided with a cross bar having two holes to admit the ends of the loop, and the ends of the loop are threaded with the nuts 99 to prevent their slipping through the holes. The guide tube is slotted to permit entrance of the cross bar as the ring slides over the tube. In effect the coiled springs keep both cables taut and exert a force to lift the free or front end of the tray until the pins 83 carried by the tray press against the cams 84 on the outer frame. When this happens the springs are even further compressed, since the cables 90 are attached to the brackets 62 and 63 which continue to rise while the sheaves 92 and 94 are attached to the tray frames 82 which cease to rise. The yielding of the springs permits the tilting of the tray as hereinabove described, and as the mechanism approaches the upper end of its stroke energy is stored in the springs to restore the tray to its horizontal position as the mechanism moves downward.

Our improved pinsetting machine includes a baffle means which is located between the front wall 61 of the ball and pin receptacle heretofore described and the front end of the pit, and which rises when the ball and pin receptacle is elevated and acts as a block to prevent pins or other objects from falling into the pit while said receptacle is elevated. The baffle which is shown generally in Figs. 4, 5 and 6, and in detail in Figs. 12 to 15, comprises a vertical board 100 which is located between the tray member 61 and the front of the pit and extends transversely across the alley to a point adjacent the outer edge of each gutter. At each side of the alley this board carries a pair of vertically disposed rollers 101 and 102 adapted to move upwardly along channels 102a secured to the front face of the pit. By means of two springs at each side of the alley as the springs 103 and 104, which are positioned about vertical guide rods 105 and 106, the board is urged to move upwardly from its normal position below the surface of the alley to a position where its top edge is about six inches above the alley surface. The guide rods are secured at their base to the floor of the pit, and the springs each react against the closed ends of tubes 103a and 104a which surround them and which are secured to the board 100 by means of brackets 103b and 103c. A pair of forwardly extending bent lugs, as the lug 107 (Fig. 15), which are secured to the bottom of each end of the board 100, come to rest against respective stops, as the stop 108, to halt the upward movement of the baffle. Rearwardly directed bent lugs as the lug 109 are positioned at the bottom of each end of the board so as to be engaged by the bottom front edge of the ball and pin tray member 61 as said member moves downwardly, and, consequently, the baffle moves downwardly with the ball and pin receptacle and is held in its down position while said receptacle is in the pit. In such position the upper edge of the baffle is below the level of the alley floor and offers no obstruction to the ball or pins.

However, when the ball and pin receptacle A rises, the baffle board 100 will also rise until said board is stopped in the manner above described. In this position its upper edge is preferably about six inches above the alley floor, thus preventing any pins or other objects from rolling into the pit beneath the ball and pin receptacle. Additional rollers, as the rollers 110 (Fig. 12), are adapted to rotate on a horizontal axis in the forked bracket 111 and act to relieve side pressure on the earlier described guide rollers and to prevent the baffle board from jamming.

The ball carrier

When the ball and pin carrying tray 60 is tilted, the pins carried by said tray fall behind the pit cushion into the pin elevating mechanism C, while the ball is received by the ball carrier, the ball carrier is elevated, and the ball is discharged onto the ball return track 57 which runs across the alley above the pit.

The ball carrier, which is shown generally in Fig. 1 and in greater detail in Figs. 5 and 16, consists of a pair of substantially parallel bars 115 and 116 which are preferably rubber cushioned and which are secured at their ends to a pair of crescent shaped bracket members 117 and 118 which in turn are pivotally mounted upon pins carried by extensions 119b and 120b of end plates 119 and 120, respectively. Each of the end plates is provided with lower and upper rollers, as the rollers 121 and 122, adapted to run between vertical guide bars 123 (Fig. 16) secured to the pit structure. The end plates are also provided at their upper and lower ends with fastenings for the raising cables 135 and 137 and the lowering cables 134 and 136, and a counterweight 128 is provided to facilitate the raising and lowering of the ball carrier.

Figure 17 shows a schematic representation of the cable reeving for the ball carrier. A hydraulic piston and cylinder device indicated at 130 is adapted to move a reeving carriage 131 either to the left or right as shown, and a cable 132 is anchored adjacent said reeving carriage and connected to the counterweight 128. Another cable 133 returns from said counterweight to the reeving carriage and is anchored adjacent thereto. One end of the ball carrier is connected to the counterweight by means of the cables 134 and 135, and the other end of the ball carrier is connected to the counterweight by means of the cables 136 and 137. As may be seen from the drawings, if the reeving carriage is caused to move to the left toward the hydraulic cylinder, the counterweight will be elevated and the ball carrier caused to move downwardly, while if the reeving carriage is moved to the right, away from the hydraulic cylinder, the ball carrier will be elevated.

The pivotally mounted crescent shaped brackets 117 and 118 which carry the aforementioned bars each have hooked portions 117a and 118a at their upper ends, these hooked portions being adapted to rest against respective stop pins 119a and 120a (Fig. 16) which project inwardly from the respective end plates 119 and 120 so that the bars 115 and 116 will be held at the proper angle to receive the ball when the tray 60 is tilted and to retain the ball during the time it is being raised to the level of the return track 57. In addition the pivoted brackets 117 and 118 each carry an outwardly extending pin noted at 117b and 118b respectively, each adapted to engage an arcuate cam as the cam 140 in Fig. 5 at the end of the upward movement, these cams causing the brackets to be pivoted on the pins carried by the extensions 119b and 120b of end plates 119 and 120 a sufficient extent to discharge the ball onto the return track. It will be understood that the carrier bars 115 and 116 are each spaced a distance apart only slightly less than the diameter of a bowling ball so that they will catch the ball while allowing the pins to fall therebetween.

The pin elevating mechanism

The pin elevating mechanism shown in Figs. 1 and 5, and in greater detail in Figs. 18 to 21, comprises a basket 150 which is normally located in the pit 55 behind the pit cushion 56 as shown in solid lines in Figure 1, and is adapted to receive the pins discharged from the ball and pin receptacle A. Means are provided for elevating this basket with its load of pins to a point adjacent the top of the machine as shown in dotted lines in Figure 1, and for discharging the pins from the basket into a sorting and distributing mechanism to be hereafter described, this means comprising a hydraulic piston and cylinder arrangement, connecting cables, and a counterweight 151.

The means for raising and lowering the basket 150 is shown schematically in Figure 19 where the action of a hydraulic piston and cylinder device 152 moves a reeving carriage 153 forwardly and backwardly. A pair of cables 154 and 155 are anchored adjacent the reeving carriage, and connected at their other ends to the counterweight 151, and it will be seen that movement of the carriage to the left in Figure 19 will result in paying out the cable 154 and pulling in the cable 155 to cause the counterweight to move upwardly, while movement of the reeving carriage to the right will cause the counterweight to move downwardly. One side of the basket 150 is connected to the counterweight by means of a lowering cable 156 and a raising cable 157, and the other side of the basket is connected to the counterweight by means of a lowering cable 158 and a raising cable 159 so that movement of the counterweight 151 in one direction results in movement of the basket 150 in the other direction.

Referring again to the structure of this elevating apparatus, the pin basket 150 (Fig. 20) consists of a box-like structure having bottom and side walls 150a of wire mesh supported on a welded steel frame 150b, said frame being equipped on each end with a pair of rollers as the rollers 160 and 161 mounted on a bracket 160a carried by the frame 150b. The rollers of each pair are located one above the other and are adapted to run in vertical grooved tracks 162 (Fig. 5) on each inner side of the pit structure. There are also brackets 163, 164, 165 and 166 on the basket providing connections for the raising and lowering cables.

The wire mesh 150a is so disposed around the framework 150b to form a basket which is open at the top and at the front side which faces the players' end of the alley. The rear wall of the basket is vertical, but the side walls slope inwardly from the top at an angle of about 30° with the vertical. The bottom slopes downwardly toward the front or open side at an inclination of about 60° with the vertical so that the pins within the basket 150 are constantly urged by gravity to be discharged from the open front side of the basket. The front side of the basket is closed by means of a hanging door 167 (Figs. 1, 5 and 20) which is pivotally connected to the basket at the top and is secured in closed position by means of a latch 168 which is automatically tripped when the basket reaches a desired elevation, a fixed stop 169 (Fig. 5) being mounted on the main machine framework to trip the latch.

The latch 168 is pivotally mounted on a bracket 150c attached to and extending below the basket frame 150b, and the rear end of the latch is connected to a triangular cam 168a by means of a spring 168b. The cam 168a is rigidly secured to a rearwardly extending cam finger 168c adapted to engage the stop 169, this cam finger and triangular cam 168a being pivotally supported on a bracket 150d which is affixed to and extends below the basket frame 150b. As the basket moves upwardly so that the cam finger 168c engages the stop 169 on the main structure framework, the cams 168a and 168c pivot on the bracket 150d, and a pin 168a' in the triangular cam 168a forces the rear end of the latch upwardly, causing the latch to pivot and release the door 167. After the finger 168c passes the stop 169 the springs 168b and 174 cause the latch to pivot into latching position. As the basket 150 moves downwardly on its return stroke the cams 168a and 168c again pivot, but in the opposite direction, when the cam finger 168c engages the stop 169.

Once the latch is tripped the door 167 is free to open under the pressure of the pins within the basket. However, means are provided to positively open the door in the event the weight of the pins fails to do so, further upward motion of the basket beyond the stop 169 bringing these means into operation. The door 167 carries at its top and on each end adjacent opposite sides of the alley an arm 170 (Figs. 20 and 21) which is mounted on the door adjacent the door hinge 170a and extends at approximately right angles to the plane of the door. In the arm is a pin 171 which is adapted to be engaged when the basket approaches the end of its upward stroke by a pivoted cam 172 carried by the main machine frame, thus causing the arm 170 to swing outwardly as shown in Fig. 5 and the door 167 to be opened. The cam 172 is spring held against a stop 173 (Fig. 21) to prevent clockwise rotation beyond the position shown in Fig. 21, which would tend to close the door rather than to open it. Further upward movement of the basket carries the pin 171 past the cam, permitting the door 167 to close by its own weight. During downward movement of the basket the pin 171 on the door arm pushes the pivoted cam 172 out of its path, said cam rotating in a counterclockwise direction as shown in Fig. 21, and the door closes and is latched, the latch 168 being urged into latching position by the spring 174.

In operation of the device the basket normally rests adjacent the floor behind the pit cushion 56 where it receives pins which are discharged from the ball and pin receptacle. As the basket rises with its load of pins it reaches a point where its front bottom edge is level with the receiving board 58 leading to the pin sorter. At this point the door latch 168 is tripped, permitting the pins to push the door open. However, the basket is elevated to a further point, and the door 167 is positively opened to insure that the pins contained therein are discharged.

Pin sorter

When the door of the pin basket opens the pins are spilled upon the inclined receiving board 58 and roll or slide down said board toward the dribble belt 59 which runs transversely of the alley and carries the pins into the pin sorter and distributing mechanism indicated generally in Figures 1 and 5 at D. As shown in Figure 5 a sloping side wall 180 meets the receiving board at an angle of approximately 45° and acts to guide the sliding and rolling pins so that they are spilled upon the dribble belt 59. The side wall 180 terminates at its front end by intersecting with another board 181 rising on a slope from the front edge of an entry box 182, the two boards 180 and 181 lying in planes which form two sides of a pyramid in such manner that all planes and their intersections are oblique to the path of the pins on the dribble belt and cause no obstruction to their motion, and at the same time act to guide such motion.

The dribble belt comprises an endless conveyor 59 turning about the sprockets 183 and 184 (see Fig. 25), and as the pins reach the end of their travel along said belt they fall into the entry box 182 of the pin sorter. This box has sloping sides which guide the pins over a side wall and into the pin sorter which extends transversely of the alley and comprises a drum-like rotor member 185 and a stationary front wall member 186, and is shown in detail in Figures 25 and 26. The drum-like rotatable member 185 is arranged to rotate about an axis longitudinal of the alley, and has an axial internal length not greatly in excess of the largest diameter of a bowling pin, so that the pins may not turn crosswise therein. The rotor rim rests upon two grooved rollers 187 and 188 which are driven in unison by a cross shaft 189 which may be belted or geared to a motor 190, the drive ratio being such that when the motor is driven a rotary motion of about twelve revolutions per minute is imparted to the rotor. This drive connection is illustrated schematically in Figure 33.

Within the sorter and projecting inwardly from the alley or front side of the rotor 185 are a series of equally spaced paddles. As shown in Figures 25 and 26 there may be seven of these padles so spaced around the rotor wall that one pin may be received and retained lengthwise between any pair of paddles, the pin resting with either head or butt end first as may occur. In cross section each paddle is in the form of two fingers 191 and 192 adapted to pass between the corresponding fingers of ejector doors to be hereafter described.

Around the top of the pin sorter are five ejector doors, 193, 194, 195, 196, and 197, said doors being located opposite arcuate apertures in the upper side of the stationary front wall 186, and one the front or alley side of the sorter. When closed these doors lie approximately in the plane of the front wall of the sorter and act as a continuation of said wall to retain the pins in the sorter.

As shown in Figure 26, each door comprises a base portion, as the portion 197a, and two spaced fingers as the fingers 197b and 197c, these fingers being so spaced as to allow the paddle members 191 and 192 to pass therebetween when the door is swung to its pin ejecting position. A spring 198 encompasses the lower hinge pin 197d of each of said doors and normally holds the doors in the plane of the stationary sorter wall.

One of a plurality of chutes, to be hereafter described, extend to a point adjacent the respective arcuate openings in the sorter wall, and when it is desired to eject a pin into any one of these chutes one of the solenoids 200, 201, 212, 203 or 204 is energized and causes the corresponding ejector door to swing on its hinge pins so that the fingers of the door move into the sorter. In Figure 26 the doors 193, 194, 196 and 197 are shown in their normal closed position in the plane of the sorter wall while the door 195 is shown as being opened into the sorter to eject a pin from said sorter. Each door is returned to its closed position by means of the above mentioned springs 198 and a solenoid, to be hereafter described, which is energized after the passage of a single pin through said door.

The sequential timing arrangement for this portion of the machine is such that the first pin which is carried up and around by the rotor paddles 191—192 will pass the first four ejector doors and be removed by the fifth door 197; the second pin will pass three doors and be removed by the fourth door 196; and this sequence of operation will be continued until all pins are removed, the first and sixth pins passing through the ejector door 197, the second and seventh pins passing through the ejector door 196, the third and eighth pins passing through the ejector door 195, the fourth and ninth pins passing through the ejector door 194, and the fifth and tenth pins passing through the ejector door 193.

The solenoids 200 to 204 are energized by means of a switch associated with each solenoid, the switches designated as 205, 206, 207, 208 and 209 in Figure 25 being utilized to open the respective doors, and the switches 210, 211, 212, 213 and 214 being utilized to close the doors through the energization of solenoids 616, 617, 618, 619 and 620. A plurality of cams 215, are carried by the rotor 185, one of such cams being carried in each pin position, or between each pair of paddles. A detector door is associated with each ejector door, said detector doors being shown in Figure 26 at 216, 217, 218, 219 and 220, and each detector door actuates an electric switch as a bowling pin passes beneath the door, this action serving to condition the circuit of the solenoid utilized to open the next ejector door.

An anti-jamming device is provided within the sorter to prevent a misplaced pin from jamming as it enters the area of the doors. This device is illustrated in Figures 26, 27 and 28, and comprises an arcuate finger 230 which is pivotally mounted at 231 on an arm 232, said arm being itself pivotally mounted on the sorter frame at 233. The finger 230 is spring held to the position shown in the drawings by the spring 234 which surrounds a guide rod 235, said guide rod extending from said finger 230 to the upper end of a bracket 236 mounted on the end of the arm 232. The spring reacts at one end against the bracket 236 and at the other end against the finger 230 and tends to rotate the finger in a counterclockwise direction. The arm 232 is spring held in position by means of the spring 237 extending from a lug 232a on said arm to a bracket 238 carried by the stationary wall 186 of the pin sorter. The finger 230 and the arm 232 are free to shift forward if a pin which is displaced from its normal position presses against the finger 230. The resultant movement of the anti-jam device is employed to actuate microswitch 239 which will reverse the direction of rotation of the pin sorter rotor for a brief interval, thus allowing the pin to fall into its normal position between the paddles.

For the purpose of receiving the pins from the pin sorter and delivering them to the pin setting apparatus, a pin distributing mechanism is provided, this mechanism comprising a plurality of chutes for receiving pins from the sorter, upending mechanism to arrange the pins with their head ends all in the same direction, a distributing box associated with each chute, including a pin switch to direct pins alternately into separate channels, and means for delivering pins from these channels to the pinsetting mechanism.

Figure 2:
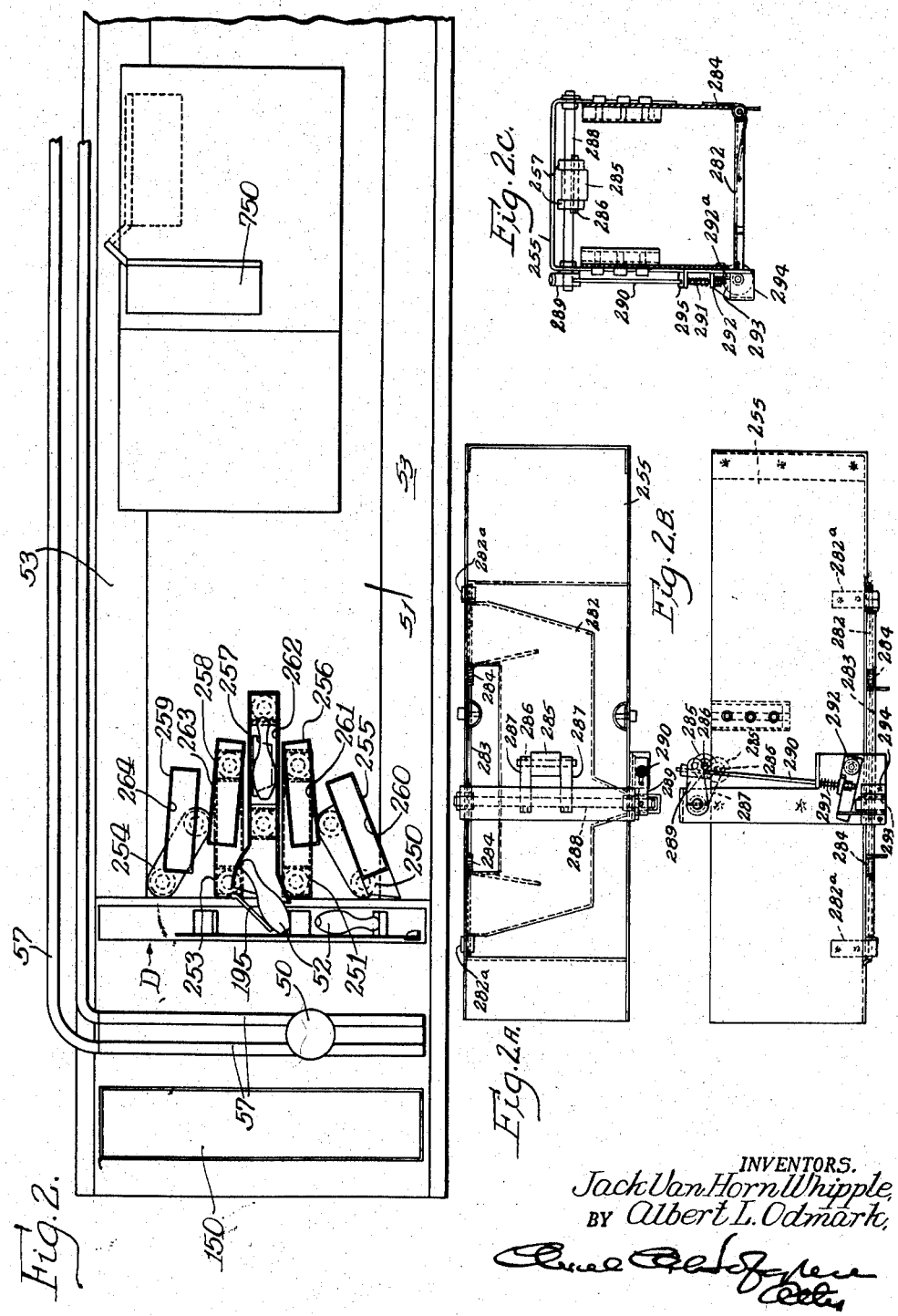
Figure 2 is a fragmentary plan view of the apparatus shown in Figure 1.
Figure 3:
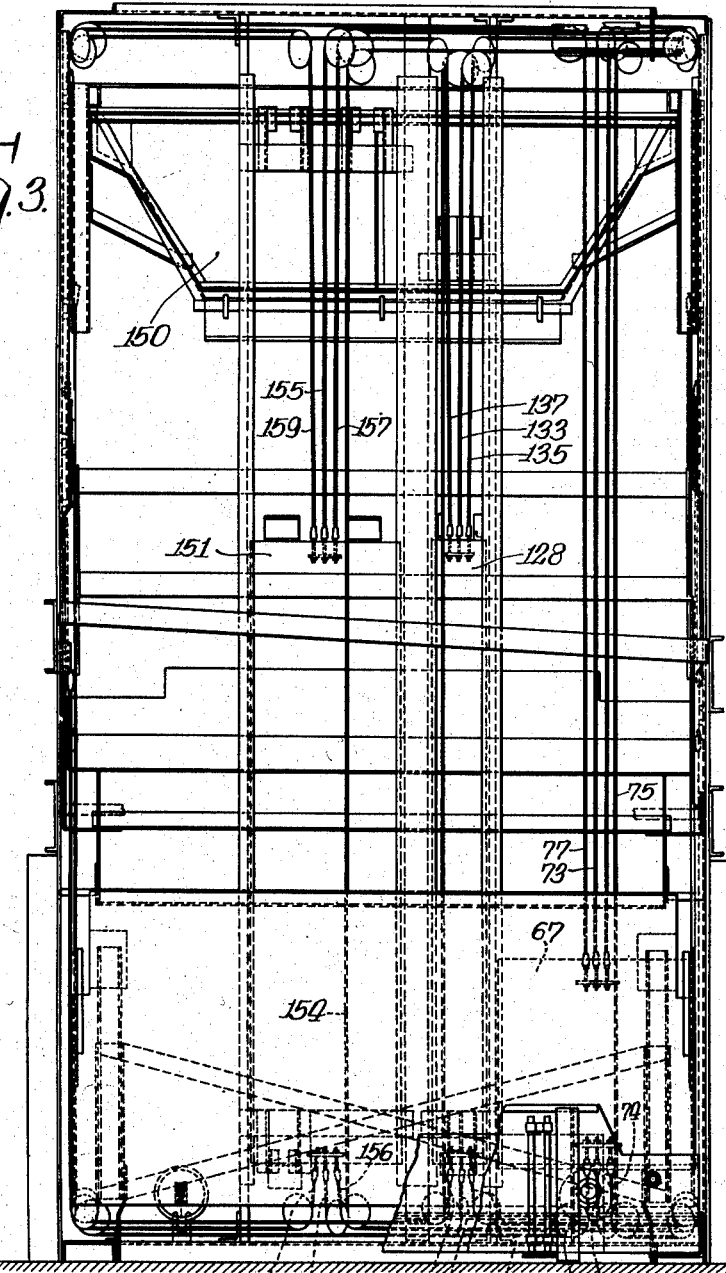
Figure 3 is an enlarged rear elevation of the machine looking from the left of Figure 1 and showing the framework and certain of the counterweights, cables and reeving.

As shown in Figures 2 and 29, each of the pin chutes 250, 251, 252, 253 and 254 terminate at their upper portions adjacent one of the respective ejector doors 193, 194, 195, 196 and 197 of the pin sorter, and as each of said ejector doors operates to remove a pin from the pin sorter the pin passes into the adjoining chute, operating the associated detector door 216–220 in its passage. Each of the chutes is inclined so that the pin will slide through the chute by gravity, and in the lower portion of each chute is an up-ending mechanism comprising a chamber with an opening in its bottom portion so arranged that if a pin enters the chamber with its heavy or butt end first it will immediately fall through the opening, while if a pin enters the chamber with its head end first the weight distribution of the pin causes the head of the pin to span the opening so that the butt end of the pin always falls through the opening first and the pin continues its descent in upright position regardless of its position when it entered the chamber. These chambers are designated at 255, 256, 257, 258 and 259, and the respective openings are designated at 260, 261, 262, 263 and 264 in Figure 2, while the action of pins in passing through the up-ending mechanism is illustrated in Figure 1.

Each of the chambers 255, 256, 257, 258 and 259 is equipped with a trap door in the bottom which is opened by means of a tripping mechanism shown in detail in Figs. 2A, 2B and 2C to insure that each pin is properly up-ended before passing out of the respective chambers. Referring now to Figs. 2 A–C, the chamber 255 has a trap door 282 mounted in its bottom discharge opening 260, this trap door being mounted by means of hinges 282a on a shaft 283 and being biased to its normal horizontal or closed position by means of a pair of springs 284.

As the bowling pin 52 falls into the chamber 255 the largest diameter or belly portion of said pin strikes a tripper roller 285, said roller being carried on a shaft 286 mounted between a pair of tripper arms 287 which in turn are mounted on another shaft 288 extending between the side walls of the chamber 255. If pin 52 descends head end first, its head and neck will have spanned the opening 260 before the belly of the pin strikes the tripper roller 285; however, if the pin descends butt end first, its belly portion will actuate the tripper mechanism immediately and the pin will not span opening 260.

As the pin forces the tripper roller 285 upwards, the shaft 288 is caused to rotate carrying with it a release arm 289, said release arm being caused to rotate about its axis on the shaft 288 to the position shown in Fig. 2B. A release rod 290 is carried by said release arm and extends to a point adjacent the bottom of the chamber 255. As will be apparent from Fig. 2B, rotation of the release arm 289 raises the rod 290 against the pressure of a spring 291 and raises the free end of a pivoted release lock 292 to which the lower end of said release rod is secured. A release cam 293 is rotatably mounted on a bracket 294 secured to the wall of the chamber 255, said release cam normally being locked in the position of Fig. 2C by a downwardly extending catch portion 292a of the release lock 292 engaging within a notch (not shown) in release cam 293, and as the rod 290 and the lock 292 are raised, the cam 293 is released and the door 282 is free to open under the weight of the bowling pin 52.

After the bowling pin has passed out of the chamber 255, the springs 284 return the door 282 to closed position, and the spring 291 reacts against a stop bracket 295 and the upper surface of the lock 292 to force the tripper mechanism back into locked position, the shaft 288 rotating to return the tripper roller 285 to its normal position ready to be actuated by the next bowling pin.

After passing the up-ending mechanism, the pin descends into a distributing box, there being one such box associated with each chute and designated as 265, 266, 267, 268 and 269 respectively in Figure 29. Each distributing box has a single opening at its top end where the pins enter, and is divided into two channels at its bottom end so that there are ten channels, each adapted to contain one pin, and each having a lower opening located directly over a pin spot on the alley bed. This structure is illustrated in Figure 1 and in greater detail in Figure 23 where the distributing box 265 is shown as being divided into the two channels 265a and 265b. As mentioned heretofore, two pins are ejected from the sorter through each ejector door, and means are provided to direct each pin into a separate channel within the distributing box. To this end a pin switch is provided in each distributing box, such switch comprising a three-pronged member 270 pivotally mounted on the pin 271 which is journaled through the housing of the box 265. The stops 272 and 273 act to prevent the member 270 from pivoting beyond the terminal positions shown in solid and dotted lines in Figure 1, and the spring 274 is attached to a lower center portion of the member 270 and to a support member 275 on the housing of the box and acts to retain the member 270 in either of its terminal positions. As a pin descends from the up-ending mechanism it is directed by the upper prong of the member 270 into one of the two channels in the box, as the channels 265a in Figures 1 and 23. Descending into such channel 265a the pin strikes the protruding lower prong of the member 270 and the weight of the pin causes the member 270 to pivot to its other terminal position shown in dotted lines in Figure 1 so that the next pin to enter the distributing box will be deflected into the channel 265b. As the pin descends further into one of the channels 265a or 265b it actuates one of the microswitches 280 or 281 located in said respective channels, and when actuated the microswitch sends a signal to the machine to indicate that the channel with which it is associated contains a pin.

The sweep mechanism

Figure 4:
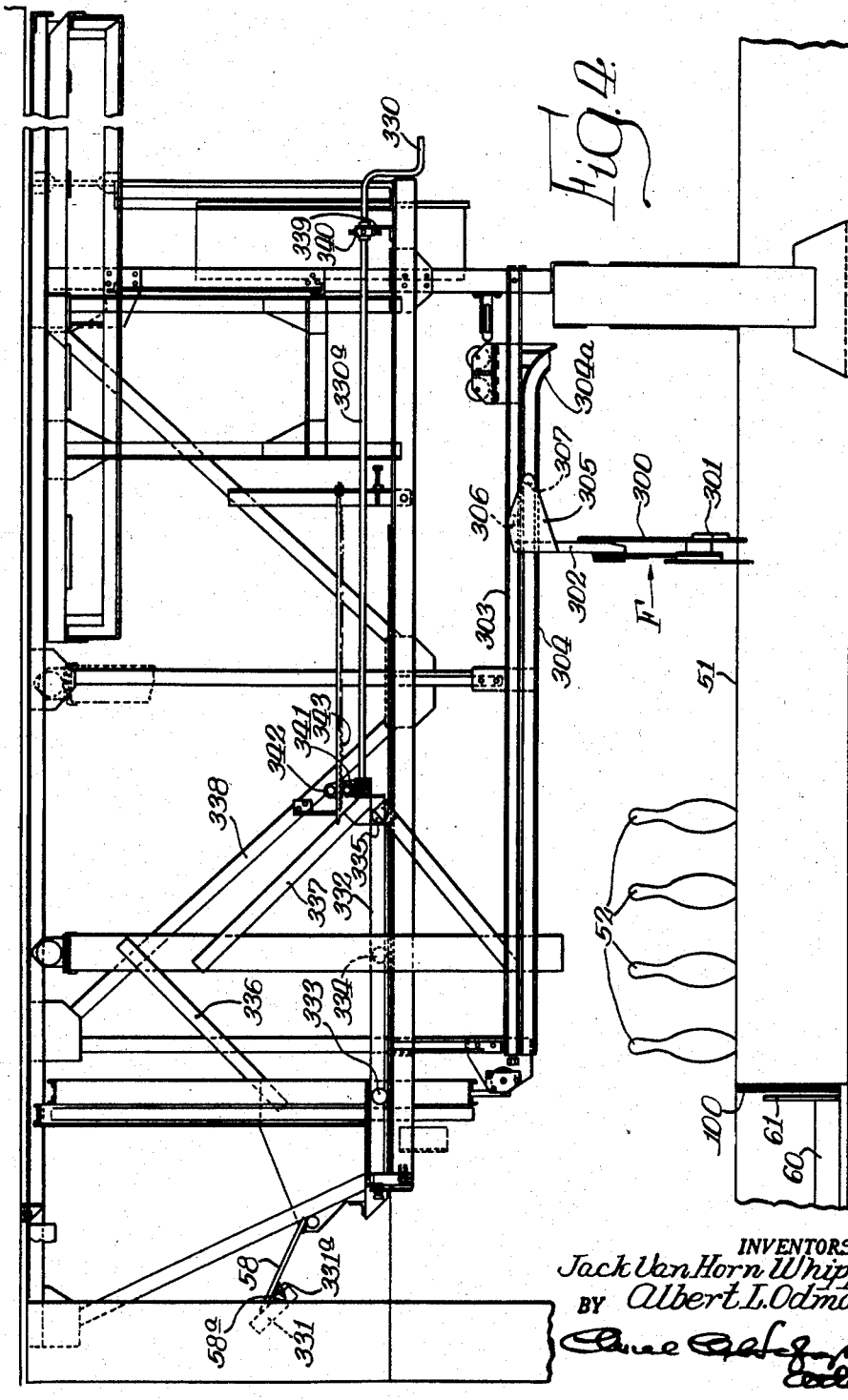
Figure 4 is a side view showing parts of the framework and the movable carriage on which certain portions of the machine are carried.

The sweep mechanism which is indicated in Figures 1 and 4 generally at F and is shown in more detail in Figures 24, 30, 31 and 32, comprises a sweep member 300 which may include a resilient portion as the rubber bumper 301 along its lower forward edge. The sweep member 300 extends transversely across the alley 51 and the gutters 53, and from its sides channel irons 302 extend upwardly. A pair of horizontal tracks 303 extend longitudinally of the alley above and on either side thereof, and below these is a second pair of tracks 304, each of said second tracks being turned downwardly at its forward end as indicated at 304a. A bracket member 305 is mounted at the upper end of each of the channels 302, each such bracket carrying a first roller 306 which engages the track 303 and supports the sweep from said track, and a second roller 307 which engages the second track 304. It will be obvious from this construction that when the roller 307 moves onto the downwardly turned portion 304a of the second track, the sweep will pivot to an out of the way position above the alley, and that when the sweep is moved rearwardly so that the roller is moved away from the downwardly turned portion 304a the sweep will be moved down to an operating position across the alley substantially ahead of the head pin.

Means are provided for moving the sweep along the alley to the pit in order to sweep any pins or other unwanted objects from the alley bed into the pit, and means are provided for operating the sweep so that it is first dropped onto the alley after a ball has been rolled, and thus serves as a guard to prevent other balls which may be rolled from striking the pins or the other machine mechanisms until the pinsetting machine has completed its operation. This mechanism is shown schematically in Figure 31 and comprises a hydraulic piston and cylinder device 310 which is operable to actuate a reeving carriage 311. A cable 312 is anchored adjacent said reeving carriage, the other end of said cable being fastened to the back of one of the brackets 305; a second cable 313 is also anchored adjacent the reeving carriage and its other end is fastened to the front of the other bracket 305; and a third cable 314 is fastened at one end to the front side of the first mentioned bracket 305, travels around a pulley system, and its other end is fastened to the back side of the other bracket 305. It will be seen that if the reeving carriage is moved to the left in Figure 31 the sweep will be moved forwardly, while if the reeving carriage is moved to the right the sweep will be moved backwardly toward the pit, the cable 314 serving in both cases to equalize the movement of both sides of the sweep.

Referring now to Figure 32, a latch mechanism is provided to retain the sweep in its out of the way position, such mechanism comprising a latch sling 315 mounted on the under side of the track 304 and carrying a latch 316 adapted to cooperate with a pair 302a carried by the sweep structure. A latch bar 317 engages a shoulder on the latch 316, said bar being biased by the latch spring 318 and urging the latch 316 to the position shown to retain the sweep member in its cammed-up position shown in Figure 32. The latch may be cammed inwardly by the pin 302a as the sweep structure swings upwardly under the control of the upper side of downwardly turned portion 304a. When the sweep structure is pulled to the left by the cable 314, the sweep structure does not descend until roller 307 engages the lower side of portion 304a and thus pin 302a moves out of engagement with the latch 316, prior to descending movement of the sweep structure.

Main frame structure

Figure 4 shows the main frame structure of the machine taken from the left hand side of the alley, most of the structure being duplicated on the opposite side of the alley as will be apparent. The receiving board 58, the pin sorter and distributing mechanism D, and the pinsetter and search mechanism E are all supported upon a carriage, and this carriage may be rolled from its operating position to an out of the way position toward the front or players' end of the alley a distance of approximately 36 inches by means of a hand operated crank 330, thus providing space for manual setting of the pins.

A bracket 331 is notched at 331a to receive the bracket 58a which depends from the under side of the receiving board 58, thus serving properly to locate the receiving board in its operating position and to provide support for the receiving board. The pin sorter and distributing mechanism D and the pin setter structure E (these mechanism not being shown in Fig. 4 which illustrates the frame) are supported in proper position on beams 336, 337 and 338 which are interconnected to form a carriage movable on rollers 333, 334 and 335 along a track 332. Crank shaft 330a is fastened to the crank 330 and extends through a supporting bracket 339 and a sleeve 340 and is joined to the movable carriage at its rear end. Said shaft 330a carries a gearing arrangement 341 and a supporting roller 342 adapted to cooperate with a rack 343 which extends longitudinally of the alley above the track 332, the arrangement being such that when the crank is turned the gear 341 rides along the rack, and the carriage carrying the receiving board, the sorter and distributor mechanism, and the search and pickup structure is moved forwardly to an out of the way position so that the rear portion of the alley is unimpeded and pins may be set manually if desired.

Pinsetting and pick-up mechanisms

The pinsetting and pick-up mechanisms indicated in Figure 1 at E comprises ten tubes respectively arranged above the pin spots on the alley bed and adapted to receive pins from the pin distributing chutes 265, 266, 267, 268 and 269, and to set pins on the alley bed in proper playing position.

In addition, a pick-up mechanism is provided to pick up spare pins after the first ball of a frame has been rolled so that the alley may be swept clear of dead wood and other unwanted objects. The pick-up unit then returns the spare pins to the alley bed in the same position from which they were picked up.

Figures 22, 22-A and 29 show this pinsetting and pick-up apparatus in elevation, and Figures 39, 40, 41, 42 and 43 show one unit of the apparatus in greater detail.

Referring first to Figs. 22 and 22A, the bottom of each of the pin distributing chutes is closed by a door 475 which is pivotally mounted on a shaft 476 suspended from the chute supporting framework on a bracket 477. The bottom of the door 475 is pivotally attached to a link 478, and another link 479 is pivotally attached to the bracket 477 at a point spaced from the point of attachment of the door 475 to said bracket. The links 478 and 479 are pivotally connected by means of a pin 480 carrying a spring 481 having generally oppositely extending fingers one of which engages each respective link 478 and 479, as shown in Fig. 22A. The reactive force of the spring urges the pin downwardly. Downward movement of said connecting pin 480 below the position of the parts as shown in Fig. 22A is prevented by a shoulder 478a on the link 478 which is engaged by the upper edge of link 479 when the parts are in the position shown, and in this position the connecting pin 480 is slightly below the level of a straight line drawn from the point of mounting of the link 478 on the door 475 to the point of mounting of the link 479 on the bracket 477. Consequently if a bowling pin is held within the chute by the door 475, the weight of the bowling pin can never cause the connecting pin 480 to shift to open the door 475 to permit the pin to drop from the chute into the pin setter which is mounted immediately below the chute (Fig. 22).

The pin setter triangular support structure 401 normally is located at or below the line 482 (Fig. 22A), and consequently an actuating finger 483 extending upwardly from said pin setter support structure (there being ten of these fingers, one located adjacent the discharge opening of each pin chute) falls short of engaging the link 479. However when it is desired to receive a new set of pins to place upon the alley bed, the pin setter support structure 401 is lifted to the level of line 484 shown in Fig. 22A, and in this event the actuating finger 483 engages the link 479 and moves the connecting pin between the links 478 and 479 upwardly, causing the door 475 to pivot on its shaft 476 so that the bowling pin is released from the pin chute and falls into the pin setter.

Ten pinsetting tubes, as the tubes 400a–400j, are carried by a triangular support structure 401, this structure being vertically movable on the tracks 403 shown in Fig. 29 and carrying with it the pin search and pick-up mechanism which comprises a triangular support 460. The support 460 has rods 402 which slide in bearings on frame 401. Blocks 461 stop the downward travel of frame 460 by engagement with the alley bed 51 while frame 401 continues its downward movement. Frame 401 carries frame 460 upwardly when the stop collars 462 on rods 402 engage collars 463 carried on extensions of support 401. This general construction is shown in United States Letters Patent No. 2,380,601, dated July 31, 1945. As shown diagrammatically in Figure 38, the movement of this structure is controlled by a hydraulic piston and cylinder device 704 which actuates the movable reeving carriage 405. A cable 406 is anchored at one end adjacent said reeving carriage, is coupled to the pinsetting mechanism by means of pulleys 407, 408 and 409, and is anchored at its other end preferably adjacent said pick-up structure. Similarly, cable 410 is anchored adjacent the movable reeving carriage 405 and is coupled to the pinsetter structure by the pulleys 411, 412 and 413 in such manner that when the reeving carriage moves to the left in Figure 38 the cables 406 and 410 act to lower the pinsetter structure, while if the reeving carriage is moved to the right the cables act to raise the pinsetter structure, these movements being facilitated by the provision of the counterweight 414.

The structure of one of the ten individual pinsetting units is shown in detail in Figures 39 and 40. The tube 400a is rigidly mounted in a bracket 415, this bracket being adapted to be secured to the supporting member 401. The bowling pin is held in position within the tube 400a by means of three similar arms 416. These arms are equally spaced around the periphery of each tube, each being pivotally mounted on a shaft 417 and having at each end a freely movable roller 418, slots 400' being provided in the walls of each tube for the admission of the arms. The shafts 417 ride on shoulders on the tube 400a permitting outward movement with respect to the tube 400a. A spring 419 connects the upper end of each arm to the bracket 415 and urges the arm to pivot at 417 so that its lower end is urged toward the longitudinal axis of the tube.

When the ten pin tubes are lowered with the supporting member 401 to set pins on the alley bed lock release bars 420 associated with each of the tubes strike the frame of the pin pick-up assembly. The pin pick-up assembly is disposed beneath the pinsetting assembly and moves relative thereto during the final portion of their downward travel. Each of these bars 420 is rigidly secured to a sleeve bracket 421a which is integral with a sleeve 421 and the bracket and sleeve are slidable on the tube 400a so that as said tube continues to move down, the bar 420 and the sleeve bracket 421a move upwardly relative to the tube. A locking plate 422 (which also moves relatively upwardly with respect to the tube along with the sleeve 421) normally keeps the shafts 417 in such a position that the three supporting arms hold the pin rigidly within the tube 400a. As this plate 422 slides upwardly on the tube 400a to a point where a cutaway portion 422a in the plate is oposite the shafts 417 and releases them for outward movement the weight of the bowling pin causes the three shafts 417 to spread outwardly, carrying the supporting arms 416 with them and freeing the pin within the tube so that it drops down to the alley, the arrangement being such that this action occurs as the entire mechanism reaches a point only slightly above the alley so that the pins drop only a very short distance. The cut sections or slots 400a' permit the necessary outward movement of the arms 416. Adjustment nuts 420a on the locking bars 420 are provided to change the effective length of these bars or the distance they extend below the sleeve brackets 421a so that this action may be adjusted to the proper point. When the hydraulic piston and cylinder 704 causes the apparatus to be raised and lifts the lock release bar 420 away from the pick-up assembly, the springs 423 force the parts back to the position shown in Figure 39 and the springs 419 properly position the arms 416 to receive and hold another pin. A pair of door guides 424 each equipped at their lower end with a roller 425 are provided to thrust open the trap doors 431a and 431b in the pressure plates 430 as the pinsetting mechanism descends through the pick-up apparatus.

Mounted below each of the pinsetter tubes is a pick-up assembly illustrated in detail in Figures 41, 42 and 43. This assembly includes means to clamp spare pins upon the alley bed and means to graps spare pins so that they may be raised above the alley in order that the alley may be swept clear of fallen pins. The means for clamping the pins to the alley bed comprises a plate or bracket member 430 which is cut out at the center and on which is hingedly mounted a trap door pressure plate 431. As shown in Figure 41 this pressure plate comprises two unequal sections 431a and 431b, and the pressure plate is retained in its upper or horizontal position by means of the springs 432 (Figs. 42 and 43) and is prevented from swinging above the horizontal position by the stops 433. Thus when the assembly is lowered so that a pressure plate contacts the top of a spare pin, the pin is clamped firmly against the alley bed, but when the assembly is lowered to set pins upon the alley the pin tubes 400 are forced down through the pressure plates 431, the respective plates swinging downwardly to accommodate the tubes. We prefer to use the unequal division of the pressure plates as shown in Figure 41 because it most often happens that a pressure plate 431 contacts a pin on a mid-line of the pressure plate, and it is only when the pin has been moved a considerable distance from its normal spot that this contact is away from a center line of a pressure plate. Since it is obvious that the weakest points on the pressure plate are along the line of division between the respective portions 431a and 431b, we make these portions of unequal size so that the pin will normally contact the portion 431b and will not normally exert its pressure along the line of division between the two portions 431a and 431b of the plate.

After the spare pins have been clamped to the alley bed they are grasped by the parallel bars 434. Each bar is carried between a pair of brackets 435 and the bars move from the outer position as shown in Figure 42 to a closed pin grasping position. In order to accomplish this movement each bracket 435 carries a pair of rollers 436 which engage tracks 437 of the pick-up assembly.

Each bracket 435 carries one of a pair of opening pulleys 438a or one of a pair of closing pulleys 438b as shown in Figure 41. An opening cable 440 is trained about the pulleys 438a, and a closing cable 441 is trained about the closing pulleys 438b.

In Figure 44 the means for opening and closing the pick-up bars is diagrammatically illustrated, there being provided a differential action so that when any one bar 434 in any of the ten pick-up units 460 a–j contacts a pin, that bar ceases motion while all the other bars of the apparatus continue to move inwardly unit each spare pin is grasped and until bars which contact no standing pins reach their inward limit of movement, this arrangement being provided while utilizing only two closing cables and two opening cables.

As shown in Figure 44 a hydraulic motor 442 is geared to a shaft 443 by means of the rack and pinion gears 444 and 445. Mounted on the shaft 443 are four drums 446, 447, 448 and 449, and around each of these drums is wound one end of one of the four cables 440, 441, 440a and 441a. It will be seen in the drawing that the opening cables 440 and 440a are wound in the opposite direction to the closing cables 441 and 441a so that rotation of the shaft 443 in one direction, as, for example, clockwise in the figure shown, will pay out the opening cables and pull in the closing cables. The cable 441 is trained in the manner shown about the pulleys 438b in the pick-up assembly 460a for the Number 1 pin, and in a similar manner is trained about similar pulleys in the pick-up assemblies 460g–460j for the Number 7, 8, 9 and 10 pins, the other end of the cable being anchored to a stationary structure 450. In similar manner the cable 441a is designed to operate the pick-up assemblies 460b–460f for the Number 2, 3, 4, 5 and 6 pins.

The opening cable 440 is trained about one of the pulleys 438a in the pick-up assembly 460a for the Number 1 pin, and then said cable runs around the two anchored pulleys 451 and 452 and then is trained about the other pulley 438a in the pick-up structure so that pulling in this cable results in opening the search bars 434 in the assembly 460a. The cable 440 in a similar manner is connected to operate the pick-up assemblies 460g–460j for the Number 7, 8, 9 and 10 pins, this cable being trained about the anchored pulleys 453 and 454 to provide the desired opening action when the cable is pulled in, and being anchored at its other end to the stationary structure 450. Similarly the cable 440a is connected to operate the pick-up assemblies for the Number 2, 3, 4, 5 and 6 pins to open the search bars in each of these assemblies.

It will be readily seen that this structure provides a differential action so that if any pin is off its normal spot and is contacted by one of the search bars, the other search bar which is contained in that particular pick-up assembly continues its motion to grasp the pin, and the search bars of all the other assemblies also continue their motion until all the spare pins are grasped or until the bars reach the limit of their movement.

By this arrangement it will be seen that a pin which is off its spot in a direction at an angle to the longitudinal axis of each search bar will be grasped because of the differential action of the search bars, while a pin which is off its normal spot in a direction parallel to the longitudinal axis of the search bars will be grasped somewhere along the length of the search bars.

A plurality of solenoid operated valves are provided to direct the movement of the various mechanisms of the machine, the operation of these valves being shown in Figure 37, the valve 710 being associated with the ball and pin elevating mechanism indicated at A in Figure 1; the valve 711 being associated with the ball elevating apparatus indicated at B in Figure 1; the valve 712 being associated with the sweep mechanism indicated at F in Figure 1, the valve 714 being associated with the pinsetting mechanisms indicated at E; the valve 713 being associated with the pin elevating basket indicated at C in Figure 1; and the valve 732 being utilized to actuate a decelerating mechanism for the pinsetting system.

Figure 34 illustrates a circuit which provides the proper operating sequence to eject pins from the five ejector doors of the rotating pin hopper, and Figure 33 shows a means for reversing the direction of rotation of the hopper when the anti-jam device operates.

In Figure 34, the solenoids 200, 201, 202, 203 and 204 which are utilized to open the respective ejector doors 193, 194, 195, 196 and 197 of Fig. 26 are shown schematically, and the switches 205, 206, 207, 208 and 209 which are utilized to energize the respective solenoids to open the doors are shown as comprising one section of double pole relays 600, 601, 602, 603 and 604, these door opening switches being closed when the respective relays are energized. Similarly, the switches 210, 211, 212, 213 and 214 which are utilized to close the ejector doors are shown as comprising the other section of these respective double pole relays, these latter switches being closed when the respective relays are deenergized.

The normally open switch 605 is adapted to be closed by the cams 215 of the rotor 185 (Fig. 25), and the switches 606, 607, 608, 609 and 610 are the switches referred to earlier in this specification as being operated by the respective detector doors 216, 217, 218, 219 and 220 (Fig. 26) when a pin passes beneath one of said doors, closure of any one of these switches energizing the electromagnetically controlled minor or stepping switch 611 to condition the circuit to open the next ejector door.

When the machine is in operation the hopper 185 is rotating and the dribble belt 59 is supplying pins to said hopper. The "demand" switches 612 and 613 are closed, while the "satisfied" switches 614 and 615 are open. In the course of rotation one of the cams 215 in the hopper closes the switch 605, completing a circuit through the relay coil 600 when the minor switch 611 is in position 1 as shown on the drawing. The solenoids 616 to 620 are in circuit which switches 214, 213, 212, 211, and 210, respectively, and when energized cause closing of ejector doors 197, 196, 195, 194 and 193, respectively. When the relay coil 600 becomes energized the switch 214 is opened, thus de-energizing the solenoid 616, and the switch 209 is closed, thus energizing the solenoid 204 and causing ejector door 197 to open. As the hopper continues to rotate the moving cam 215 opens switch 605, and the relay coil 600 becomes de-energized so that switch 209 is opened and switch 214 is closed as shown in the drawing. Solenoid 204 now becomes de-energized and solenoid 616 becomes energized, causing said ejector door 197 to close.

When an ejector door is in the open position it causes a pin which is carried up by one of the paddles 191–192 in the rotor 185 to be deflected out of the hopper and into an associated pin chute, the pin passing underneath one of the detector doors 216—220 as it leaves the rotor which conditions the circuit for operating the next ejector door. The rotor cams 215 are arranged to close the switch 605 so that an ejector door is open at the correct time to eject a pin. As the pin leaves the hopper one of the switches 606, 607, 608, 609 or 610 which is associated with the particular chute which carries the pin is momentarily actuated, thus energizing the minor switch 611, said switch stepping to position 2. If no pin is ejected the pin ejector door 197 continues to open each time a cam 215 closes switch 605 until a pin is ejected, and in the following description it is assumed that a pin is brought up by every paddle.

When the minor switch 611 is in position 2, closure of switch 605 by one of the cams 215 results in the energization of solenoid 601 rather than solenoid 600, opening switch 213 and closing switch 208 so that solenoid 203 becomes energized to open ejector door 196, this door subsequently being closed by means of solenoid 617 when the cam 215 opens switch 605. This action continues, solenoids 202 and 618 serving to control ejector door 195, solenoids 201 and 619 serving to control ejector door 194, and solenoids 200 and 620 serving to control ejector door 193. At this point in the cycle the pin which is ejected from door 193 actuates switch 610, and this causes the minor switch 611 to move to position 6 from which it "homes," or moves back to position 1. This last pin also opens the switch 612 and closes the switch 614. When rotor cam 215 again closes the switch 605, relay 600 is again energized and the cycle is repeated until a second group of five pins has been ejected, one from each door, and by means of the distributing mechanism earlier described are arranged in the remaining five pin chutes. The second pin which is ejected from door 193 actuates switch 610, causing the minor switch to "home" back to position 1, and this last pin also opens switch 613 and closes switch 615. Since the "demand" circuit including switches 612 and 613 is now open, closure of switch 605 no longer energizes any of the relays 600, 601, 602, 603 and 604, so that no more pins can be ejected from the sorter until the pinsetting unit removes the pins from the distributing chutes.

The means for backing the rotor or hopper 185 in the event a pin jams therein are illustrated diagrammatically in Figure 33. The hopper drive and feed belt motors illustrated diagrammatically at 190 and 628 respectively may be started by a main start button comprising the switches 620 and 621 and normally drive the hopper in one direction. The back-off system about to be described causes the hopper drive motor 190 to reverse and motor 190 drives the hopper in a reverse direction for a short distance and is then reversed again to drive the hopper in its normal direction. This operation is repeated until the pin jammed is free. The feed belt stops during the period of reversal or oscillation.

As described in an earlier point in this application and illustrated in Figure 28, a microswitch 239 which is associated with the anti-jam mechanism in the rotor 185 is actuated in the event a pin is jammed within the rotor.

This action causes the contactor 625 (Fig. 33) which is of a type that will lock when its associated solenoid is energized to become energized and to lock in with the result that the hopper drive motor 190 reverses, the magnetic starter 627 drops out of the feed belt drive motor circuit to open contact 627a, and the feed belt drive motor 628 stops.

The hopper drive motor 190 may be a one-half horsepower A.C. motor adapted to run at a speed of 1725 r.p.m. when energized from a 117 volt A.C. course, it being assumed that the leads 629 and 630 are connected to such a source. The motor 628 may be a one-quarter horsepower motor adapted to run at 1725 r.p.m. when energized from a 117 volt A.C. source.

The reversal of the hopper drive motor 190 causes the hopper to rotate backwardly so that the striker 635 which is mounted on said hopper operates the switch 632, causing the contactor 625 to drop out. As a consequence the motor 190 is caused to reverse again so that it runs in its normal direction.

The hopper now is rotating in its forward or normal direction, and if a pin is still jammed within the hopper, the switch 239 is again actuated and the reversing cycle is repeated.

However, in the event the jam within the hopper is cleared, the striker 635 actuates the feed belt start switch 636 which drops to an open position after being actuated. The actuation of the switch 636 causes the magnetic starter 627 to become energized and lock in so that the feed belt drive motor 628 starts.

In the event there is a jam within the sorter in a location other than under the anti-jam mechanism so that the switch 239 is not actuated, the added resistance to the rotation of the hopper causes an increase in the current drawn by the hopper drive motor 190. This causes the relay coil 638 to become energized and the switch 638a to close. The contacts of the switch 638a cause the contactor 625 to become energized so that the reversing cycle is initiated as above described and the extent of reverse travel is governed by the location of the striker when the jam occurs.

In the event the jam does not free in either direction of rotation of the hopper the overload protection fuses 639 and 640 open and cause the hopper drive motor to stop.

*Hydraulic equipment*

Figure 37 is a schematic representation of the hydraulic equipment which operates the machine, the parts being shown in schematic form with the electrical connections to the operating solenoids being omitted.

The hydraulic equipment for the machine consists of five operating cylinders, 70, 130, 152, 310 and 704, each with its respective piston and operating valve, a reservoir 705 including a filter 706, a motor driven vane type pump 707, which may have a capacity of 2½ gallons per minute, and an accumulator 708 which may have a 5-gallon capacity, and a pressure regulating and unloading valve 709. As appears earlier in this specification, the piston and cylinder device 70 may be used to operate the ball and pin receptacle A, the piston and cylinder device 130 to operate the ball carrier B, the piston and cylinder device 152 to operate the pin basket C, the piston and cylinder device 310 to operate the sweep F, and the piston and cylinder device 704 may be used to operate the pinsetter apparatus E.

The accumulator is provided to take care of peak oil demands during the cycle and to provide a system to reduce the required pump size and consequently the required horsepower. The pressure regulating and unloading valve, which may be a "Vickers" model C–680E (special) type valve, contains an integral check valve which prevents the emptying of the system and the accumulator when the pump is not loaded. The unloading valve functions to bypass oil into the reservoir at zero pressure when the accumulator is charged to a predetermined degree, and its characteristics make the use of a separate pressure relief valve for overload protection unnecessary.

The hydraulic cylinders 70, 130, 152 and 310 together with their pistons and valving are identical, while the piston and cylinder device 704, because of higher operating loads, is larger and has a different valving arrangement because of different cycle requirements. All piston and cylinder devices are so arranged that in the normal "standby" position the pistons 70a, 130a, 152a, 310a and 704a are each in the extreme "in" position against the head end of the associated cylinder. Cylinders 70, 130, 152 and 310 will provide for substantially uniform deceleration of piston motion at the end of the stroke when the piston travels in the direction of the cylinder head, whereas uniformly decelerated motion to a low speed and slow travel to the end of the stroke are provided in the opposite direction because of the use of an orifice and relief valve through which the exhaust fluid passes as more fully described hereinafter. Cylinder 704 permits the same operating cycle by means identical to those of the other four cylinders, but includes an additional four way solenoid operated valve to permit deceleration, slow piston motion, and stopping of the piston in any intermediate piston position. The piston valves 710, 711, 712, 713 and 714 are of the closed center type so that they may be held in their stopped position. In the event considerable unbalance exists in the load, drifting of the load may occur due to some internal leakage in the system.

The operation of the ball and pin receptacle operating piston and cylinder 70 will be described in detail, it being understood that the cylinders 130, 152 and 310 operate in a similar manner. Under normal "standby" conditions the piston 70a is against the head end of the cylinder. Energization of solenoid 721 will admit oil from the accumulator through the valve ports C and B, and check valve 716 to the head end of the cylinder, moving the piston toward the upper end (in the drawing) of the cylinder. Oil displaced by the piston in the upper end of the cylinder will flow from orifice 717 and valve ports D, E and A to the reservoir until the flange 70b of the piston covers orifice 717, trapping oil in the upper end of the cylinder. Now oil can escape only through the orifice 718 and through the orifice 720 over the adjustable relief valve 719. The rate of deceleration is controlled by adjusting the pressure setting of the relief valve 719, and the size of the orifice 718 determines the velocity with which the piston will continue to move after the piston flange 70b covers the port 720. The piston is finally stopped by contacting the upper end of the cylinder or by deenergizing the solenoid 721.

If the solenoid 715 is energized, oil under pressure will be admitted from valve ports C and D, and orifice 718 to the upper end of the cylinder, and the piston will proceed slowly toward the head end of the cylinder until the flange 70b of the piston uncovers the orifice 720. Oil will then flow through the check valve 722 and the piston will proceed at full speed toward the head end of the cylinder, oil displaced at the head end of the cylinder flowing from orifice 723, and valve ports B and A to the reservoir. When the lower flange 70c of the piston covers port 723, oil is trapped between the piston and the head end of the cylinder and can escape only through orifice 724 over adjustable relief valve 725 through valve ports B and A to the reservoir. Adjustment of the relief valve 725 provides the means for adjusting the rate of deceleration, and the piston comes to rest by contacting the cylinder head or by deenergizing the solenoid 715.

In cylinder 704 control of deceleration and slow travel at the extreme ends of the piston stroke is obtained by the same means as that of cylinder 700. Deceleration, slow travel and stopping of the piston in intermediate positions is obtained by means of relief valve 730 and orifice 731 which are cut in and out of the circuit by valves 714 and 732. These valves are controlled by solenoids 733, 734, 735 and 736, and the operation of the system through its various steps will be described assuming that the piston is initially against the head or the lower end of the cylinder.

In order to lower the load (as the pinsetter E) solenoids 734 and 735 are energized, and oil is admitted from the accumulator through the valve ports 714C and 714B and orifice 737 to the head end of the cylinder, moving the piston toward the upper end. Oil displaced at the rod or upper end of the cylinder flows from orifice 738, valve ports 732c and 732d, and valve ports 714d and 714E to the reservoir.

In order to decelerate to slow travel when the piston is in an intermediate position solenoid 734 remains energized and solenoid 736 is energized and oil flows under pressure to the cylinder as in the previous paragraph. Return flow from the upper end of the cylinder is through orifice 738, pressure reducing valve 730 and orifice 731, valve port 714d and 714e to the reservoir. The rate of deceleration is controlled by the setting of the pressure reducing valve 730, and the piston will decelerate until the pressure in the return line is less than the setting of the relief valve 730, after which the piston will continue to move at a speed determined by the size of the orifice 731.

In order to stop the piston in an intermediate position all solenoids are deenergized, and valves 714 and 732 will block the oil flow to and from the cylinder. If the load is considerably unbalanced, drifting will occur at a rate determined by the leakage through the valves 714 and 732.

The piston is decelerated and stopped at its extreme up position in the following manner. When the flange 704b of the piston covers the orifice 738 oil is trapped in the upper end of the cylinder and can escape only through orifice 739 and over adjustable relief valve 740, the rate of deceleration being controlled by the adjustment of the pressure setting of the relief valve 740 while the size of the orifice 739 determines the velocity at which the piston will continue to move after the piston flange 704b covers orifice 741. The piston is finally stopped by contacting the upper end of the cylinder or by deenergizing solenoids 734 and 735.

In order to raise the load solenoids 733 and 736 are energized, and oil is admitted from the accumulator through the valve ports 714c, 714d, 732d and 732c to the upper end of the cylinder. The piston will proceed slowly toward the head end of the cylinder until the flange 704b uncovers the orifice 741, at which time oil will flow through the check valve 742 and the piston will proceed at full speed toward the lower or head end of the cylinder. Oil displaced from the head end of the cylinder flows out orifice 743, through valve ports 714b and 714a to the reservoir. When the flange 704c of the piston covers the orifice 743, oil is trapped between the piston and the head end of the cylinder and can escape only through the orifice 737, over the adjustable relief valve 743a and through the valve ports 714b and 714a to the tank, adjustment of relief valve 743a providing a means for adjusting the rate of deceleration. The piston can be stopped by deenergizing solenoids 733 and 736 or it will stop by contacting the head end of the cylinder.

As shown in Figure 1 we have so located the electrical and hydraulic controls for our improved machine that they are easily accessible for installation and repair. Both the hydraulic mechanism and the electrical control panel 750 are located above the alley at the forward end of the machine and are very readily accessible without the necessity of removing any other portions of the machine.

We claim:

1. In a pinsetting machine, in combination, an alley having a pit, pin handling apparatus including a member rotatable about a horizontal axis longitudinal of the alley, said member having an axial internal length only slightly greater than the width of a pin, means for rotating said member, means for delivering pins into said member, means spaced uniformly about the inner peripheral wall of said member and operable to engage pins spaced apart lengthwise and convey them to an upper portion of said member, and means including movably mounted members for selectively retaining pins on the member or ejecting pins one at a time from the upper portion of said rotatable member.

2. In a pinsetting machine in combination, a frame, pin handling apparatus including a drum-like member rotatable about a horizontal axis, said member having an axial internal length greater than the width of a pin but less than the length of said pin, means for rotating said member at a predetermined speed, means for delivering pins into said member, a plurality of paddle members spaced uniformly about the inner peripheral wall of said member, each paddle member comprising a pair of fingers, said fingers being operable to engage a single pin between two of said paddle members and convey said pin to an upper portion of said rotatable member, and means fixed on the frame adjacent the drum-like member including prongs movable between the paddle fingers as the drum-like member rotates to an angled position across the path of a pin on said paddle members for ejecting pins one at a time from the upper portion of said rotatable member.

3. In a pinsetting machine, in combination, pin handling apparatus including a rotatable, drum-like member, means for rotating said member, conveyor means for delivering pins into said member, a stationary confining wall for retaining pins in said member, means defining an opening in said wall through which a pin may be ejected, means on said member for carrying pins upwardly between the wall and member and means for ejecting pins one at a time from said member, said means comprising an ejector door normally lying in the plane of said wall to block the opening and movable into said member to clear the opening and engage a pin to cause ejection thereof from said member.

4. In a pinsetting machine, in combination, pin handling apparatus including a rotatable, drum-like member, means for rotating said member, conveyor means for delivering pins into said member, a stationary confining wall for retaining pins in said member, means defining an opening in said wall through which a pin may be ejected, means on said member for carrying pins upwardly between the wall and member and means for ejecting pins one at a time from said member, said means comprising a plurality of side-by-side pivotally mounted ejector doors normally lying in the plane of said wall to block the opening and movable into said member to clear at least a portion of the opening and engage pins to cause ejection thereof from said member, and means for operating said doors.

5. In a pinsetting machine, in combination, pin sorting apparatus including a rotatable, drum-like member, a stationary wall adjacent and parallel to the plane of said member having an opening in its upper portion, means for rotating said member, means for delivering pins into said member, means on said member for carrying pins upwardly between the wall and member, and means for ejecting pins one at a time from said opening, said means comprising a plurality of ejector doors each pivotally mounted on and adjacent the upper portion of said wall and spring biased to normally lie approximately in the plane of said wall within said opening to close a portion of the opening and each comprising a plurality of fingers movable into said drum-like member to engage and cause ejection of a pin when said doors are operated, and a plurality of solenoids for sequentially operating said doors.

6. In a pinsetting machine, in combination, an alley having a pit, pin sorting apparatus for sorting pins elevated from the pit for subsequent setting by the machine including a drum-like member rotatable about a horizontal axis longitudinal of the alley, said member having an axial internal length slightly greater than the width of a pin, a stationary front wall positioned adjacent said member extending transversely of the alley and having an arcuate opening in its upper portion of a shape conforming to that of the drum-like member, means for rotating said member at a predetermined speed, means for delivering pins into said member, means spaced about the inner peripheral wall of said member and operable to engage pins and move therewith to the upper portion of said member, and means for ejecting pins one at a time from the upper portion of said member, said means comprising five similar ejector doors each pivotally mounted adjacent the upper portion of said drum-like member and spring biased to normally lie approximately in the plane of said front wall within said opening and each comprising a pair of spaced fingers movable into said member to engage a pin when said doors are operated, and a solenoid for operating each of said doors in proper sequence.

7. In a pinsetting machine, in combination, an alley having a pit, pin sorting apparatus for sorting pins elevated from the pit for subsequent setting by the machine including a drum-like member rotatable about a horizontal axis longitudinal of the alley, said member having an axial internal length greater than the width of a pin but less than the length of said pin, a stationary front wall adjacent said member which extends transversely of said alley and has an arcuate opening in its upper portion conforming to the drum-like member, means for rotating said member at a predetermined speed, means for delivering pins into said member, a plurality of paddle members spaced uniformly about the inner peripheral wall of said member, each paddle member comprising a pair of fingers, said fingers being operable to engage a single pin between two of said paddle members and convey said pin to the upper portion of said rotatable member, and means for ejecting pins one at a time from the upper portion of said rotatable member, said means comprising five similar ejector doors each pivotally mounted adjacent the upper portion of said front wall and spring biased to normally lie in approximately the plane of said wall within said opening and each comprising a pair of fingers movable into said drum to engage a pin when said doors are operated, said fingers being so spaced as to allow said paddle fingers to pass therebetween, and five solenoids for operating said doors in proper sequence.

8. In a pinsetting machine, in combination, pin handling apparatus including a drum-like member rotatable about a horizontal axis, means for rotating said member in a forward direction, means for delivering pins to said member, means for ejecting pins one at a time from said member, and means operable in the event a pin jams in said member to cause said member to be rotated in a backward direction, such last mentioned means comprising an arm pivotally mounted within said drum-like member and arranged to be moved by a jammed pin.

9. In a pinsetting machine, in combination, pin handling apparatus including a drum-like member rotatable about an axis, said member having an axial internal length slightly greater than the width of said pin, means for rotating said member in a forward direction, means for delivering pins into said member, means spaced about the inner peripheral wall of said member and operable to engage pins and convey them to the upper portion of said member, means for ejecting pins one at a time from the upper portion of said member, and means operable in the event a pin is displaced in said member to cause said member to be rotated for only a brief interval in a backward direction, such last mentioned means comprising an arm pivotally mounted within said drum-like member and extending to a point adjacent said peripheral wall, a finger pivotally mounted on said arm adjacent said peripheral wall, means positioning the arm and finger to cause movement of the arm when the finger is engaged by a displaced pin, and switch means actuated by movement of said arm and operable to reverse said rotating means.

10. In a pinsetting machine, in combination, pin sorting and distributing apparatus including a rotatable pin sorter, a plurality of delivery chutes leading from said sorter, said delivery chutes having discharge openings at their forward ends, means adjacent the forward end of each chute operable to discharge pins from said chutes with the head ends up, a plurality of pin distributing devices, one associated with each delivery chute and each having two discharge channels leading to desired pin positions, and means adjacent the entrance of each distributing device operable by the weight of the pins engaging therewith to direct pins alternately to the two discharge channels.

11. In a pinsetting machine, in combination, pin sorting and distributing apparatus including a rotatable pin sorter, five delivery chutes leading from the upper portion of the sorter and extending downwardly and forwardly therefrom and having bottom discharge openings at their forward ends, means adjacent the forward end of each delivery chute operable to discharge pins from said chutes with the head ends up, five pin distributing devices, one associated with each of the delivery chutes, and each having two discharge channels leading to desired pin positions, and means adjacent the entrance of each distributing device operable by the weight of the pins engaging therewith to direct pins alternately to the two discharge channels.

12. In a pinsetting machine, in combination, pin sorting and distributing apparatus including a pin sorter member rotatable about a generally horizontal axis, peripherally spaced means on said member for holding pins spaced along the periphery of the member, a plurality of means spaced along the upper portion of said member for ejecting pins one at a time from the upper portion of said pin sorter member, a plurality of delivery chutes, each of said ejecting means having a delivery chute associated therewith, means for operating said spaced ejecting means in sequence so as to deliver pins to said chutes in sequence, said delivery chutes having discharge openings at their forward ends, means adjacent the forward end of each chute operable to discharge pins from said chutes with the head ends up, and a pin distributing mechanism associated with said chutes and operable to direct pins to desired positions.

13. In a pinsetting machine, in combination, pin handling apparatus including a rotatable member, said member having an axial internal length slightly greater than the width of a pin, means for rotating said member at a predetermined speed between a lower pin receiving position and an upper discharge position, means for delivering pins into said member, means spaced about the inner peripheral wall of said member and operable to engage pins spaced apart lengthwise and move them therewith to the upper portion of said member, means including movably mounted pin engaging elements operable as each pin goes by the upper discharge position to retain a pin on said member or movable into the path of a pin to discharge a pin from the upper portion of said member, means for moving the elements to discharge pins from the member including a circuit having an electrically responsive element, and a switch for rendering said circuit inoperative when pins are not to be discharged from said member.

References Cited in the file of this patent

UNITED STATES PATENTS

| | | |
|---|---|---|
| 1,468,212 | Redfield | Sept. 18, 1923 |
| 1,524,241 | Hedenskoog | Jan. 27, 1925 |
| 1,706,271 | Williams | Mar. 19, 1929 |
| 2,015,428 | Hedenskoog | Sept. 24, 1935 |